United States Patent
Naguib et al.

(10) Patent No.: US 12,519,559 B2
(45) Date of Patent: *Jan. 6, 2026

(54) MAC ARCHITECTURES FOR ADAPTIVE NOMA MODULATION

(71) Applicant: Apple Inc., Cupertino, CA (US)

(72) Inventors: Ayman F. Naguib, Cupertino, CA (US); Danila Zaev, Munich (DE); Kenza Hamidouche, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 411 days.

This patent is subject to a terminal disclaimer.

(21) Appl. No.: 17/949,777

(22) Filed: Sep. 21, 2022

(65) Prior Publication Data

US 2024/0097815 A1  Mar. 21, 2024

(51) Int. Cl.
*H04L 1/00* (2006.01)

(52) U.S. Cl.
CPC .......... *H04L 1/0003* (2013.01); *H04L 1/0041* (2013.01)

(58) Field of Classification Search
CPC ............... H04L 1/0003; H04L 1/0041; H04L 2001/0092; H04L 1/0015; H04L 1/0009; H04L 27/34
See application file for complete search history.

(56) References Cited

U.S. PATENT DOCUMENTS

| | | | |
|---|---|---|---|
| 12,225,534 B2 | 2/2025 | Kang et al. | |
| 2013/0208715 A1* | 8/2013 | Roh | H04L 1/0025 370/338 |
| 2019/0222371 A1* | 7/2019 | Sahin | H04L 27/3416 |
| 2020/0092057 A1* | 3/2020 | Herath | H04W 72/0466 |
| 2021/0119734 A1 | 4/2021 | Mheich et al. | |
| 2022/0312225 A1* | 9/2022 | Li | H04B 7/0695 |
| 2023/0403707 A1 | 12/2023 | Wu et al. | |
| 2024/0097815 A1 | 3/2024 | Naguib et al. | |

OTHER PUBLICATIONS

Teresa M. Braun; Walter R. Braun, "Digital Communications Theory," in Satellite Communications Payload and System, IEEE, 2021, pp. 353-404, doi: 10.1002/9781119384342.ch12 (Year: 2021).*

* cited by examiner

*Primary Examiner* — Sun Jong Kim
(74) *Attorney, Agent, or Firm* — Brownstein Hyatt Farber Schreck, LLP

(57) ABSTRACT

A device includes a wireless transceiver and a processor. The processor is configured to determine a direction of transmission for a non-orthogonal multiple access (NOMA) transmission; determine a set of resources to be used for the NOMA transmission; determine a forward error correction (FEC) coding scheme to be used for the NOMA transmission; determine, using a codebook, a joint modulation scheme to be used for the NOMA transmission; and transmit or receive the NOMA transmission on the set of resources, in accord with the direction of transmission, the FEC coding scheme, and the joint modulation scheme.

15 Claims, 18 Drawing Sheets

1400

| DETERMINE A SET OF RESOURCES TO BE USED FOR A SET OF MULTIPLEXED NON-ORTHOGONAL MULTIPLE ACCESS (NOMA) TRANSMISSIONS TO OR FROM A SET OF WIRELESS DEVICES | ⟵ 1402 |

↓

SELECT, PER INDIVIDUAL WIRELESS DEVICE OF THE SET OF WIRELESS DEVICES, A FORWARD ERROR CORRECTION (FEC) CODING SCHEME TO BE USED FOR A RESPECTIVE NOMA TRANSMISSION, OF THE SET OF MULTIPLEXED NOMA TRANSMISSIONS, TO OR FROM AN INDIVIDUAL WIRELESS DEVICE ⟵ 1404

↓

SELECT, FROM A CODEBOOK, A JOINT MODULATION SCHEME TO BE USED FOR THE SET OF MULTIPLEXED NOMA TRANSMISSIONS ⟵ 1406

↓

TRANSMIT, VIA THE WIRELESS TRANSCEIVER AND TO A WIRELESS DEVICE OF THE SET OF WIRELESS DEVICES, A FIRST INDICATION OF THE FEC CODING SCHEME FOR A RESPECTIVE NOMA TRANSMISSION TO OR FROM THE WIRELESS DEVICE, AND A SECOND INDICATION OF THE JOINT MODULATION SCHEME ⟵ 1408

*FIG. 14*

MAC ARCHITECTURES FOR ADAPTIVE NOMA MODULATION

TECHNICAL FIELD

This application relates generally to medium access control (MAC) architectures, including MAC architectures for adaptive non-orthogonal multiple access (NOMA) modulation.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 12-16 illustrate various examples of methods that may be performed by various devices using the techniques and principles described herein.

DETAILED DESCRIPTION

Figure 1:
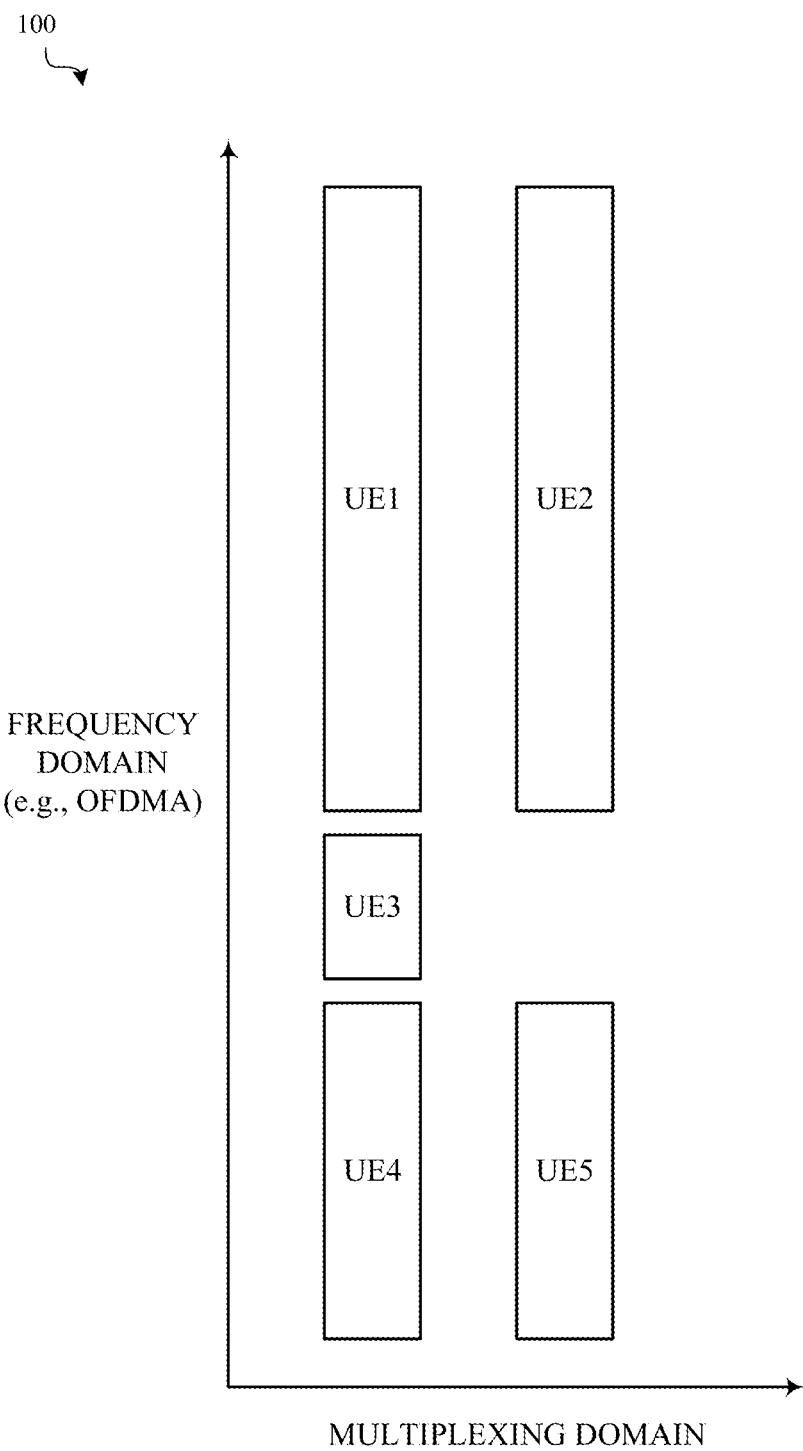
FIG. 1 shows an example set of multiplexed NOMA transmissions.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with a network. Therefore, the UE as described herein is used to represent any appropriate electronic device.

Some wireless communication technologies are based on orthogonal frequency-division multiple axis (OFDMA) communication techniques, in which a frequency spectrum is divided into multiple orthogonal subcarriers (frequencies) and different ones or subsets of the subcarriers are allocated for different wireless communications (e.g., communications between different wireless devices). By way of example, OFDMA communication techniques are currently used for 4G, 5G, and Wi-Fi® communications.

Although OFDMA, massive multiple-input multiple-output (MIMO) (e.g., multi-user (MU)-MIMO), and other communication techniques provide efficient resource allocation in many scenarios, there are scenarios in which NOMA communication techniques may be more suitable or advantageous. In contrast to OFDMA communication techniques, NOMA communication techniques contemplate the sharing of a resource or set of resources by multiple users (e.g., the multiplexing of different NOMA transmissions, of two or more users, on a shared time and frequency resource or set of time and frequency resources) and provide means for handling (e.g., canceling) interference between different NOMA wireless communications. However, a MAC architecture for deploying NOMA communication techniques in a wireless communication network (e.g., in a 3GPP RAN, Wi-Fi®, or device-to-device (D2D) network) does not exist.

One scenario in which NOMA communication techniques may be useful is the case in which a set of devices is under control of a single entity (e.g., a person, company, or organization), deployed in the same area, and exposed to the same channel conditions. For example, a person may have a mobile phone, a laptop or tablet computer, and one or more wearable devices (e.g., an electronic watch, an extended reality headset or smart glasses, and so on) that are all capable of communicating with a 3GPP RAN, Wi-Fi® network, or other nearby devices.

Another scenario in which NOMA communication techniques may be useful is in the case of mobile edge computing, in which a set of mobile devices simultaneously offload their computational tasks to a centralized server via a wireless network edge device.

Another scenario in which NOMA communication techniques may be useful is in the case of D2D communications between wireless devices that do not have massive antenna arrays (e.g., scenarios in which MU-MIMO cannot be deployed). For example, D2D communication channels (or links) can be multiplexed, using NOMA communication techniques, for 3GPP sidelink communications managed by a base station, as well as for D2D communications that are not managed by a base station.

In order to achieve communication rates that are close to channel capacity, modern communication systems implement adaptive modulation and coding (AMC) functionality. To enable AMC, both a wireless transmitter and a wireless receiver should agree in advance on a family of modulation schemes from which a modulation scheme can be selected. Different modulation schemes can be selected for different communications, at different times, or for different communications between different wireless devices. A family of modulation schemes may be considered a modulation scheme codebook. A set of quadrature amplitude modulation (QAM) modulation schemes is one example of a family of modulation schemes. In a 5G NR environment, a QAM modulation scheme (e.g., a QAM4 (quadrature phase shift keying (QPSK)), QAM16, QAM64, QAM256, or QAM1024 modulation scheme) may be adaptively selected, by a base station, after predicting a signal-to-interference-plus-noise ratio (SINR) for a transmission. The QAM modulation scheme may be selected, for a transport block (TB), as a monotonically increasing function of the predicted SINR. The base station may then indicate a selected modulation scheme to a UE. The modulation scheme may be indicated via a modulation and coding scheme (MCS) index, which MCS index may be transmitted to a UE in downlink control information (DCI) or uplink control information (UCI).

FIG. 1 shows an example set 100 of multiplexed NOMA transmissions. The transmissions are shown with respect to a frequency domain (e.g., different frequency subcarriers, extending along the y-axis) and a multiplexing domain. Each NOMA transmission is labeled with an indicator of a wireless device (e.g., UE1, UE2, UE3, UE4, or UE5) that transmits or receives the NOMA transmission.

NOMA transmissions that have different positions along the y-axis are transmitted on different frequency subcarriers or different subsets of frequency subcarriers. NOMA transmissions that have the same position along the y-axis may be transmitted on the same set of time and frequency resources (or resource elements (REs)) as a set of multiplexed NOMA transmissions. Thus, the NOMA transmissions from/to UE1 and UE2 are a first set of multiplexed NOMA transmissions, and the NOMA transmissions from/to UE4 and UE5 are a second set of multiplexed NOMA transmissions. The NOMA transmission from/to UE3 may be a conventional OFDMA transmission.

Figure 2:
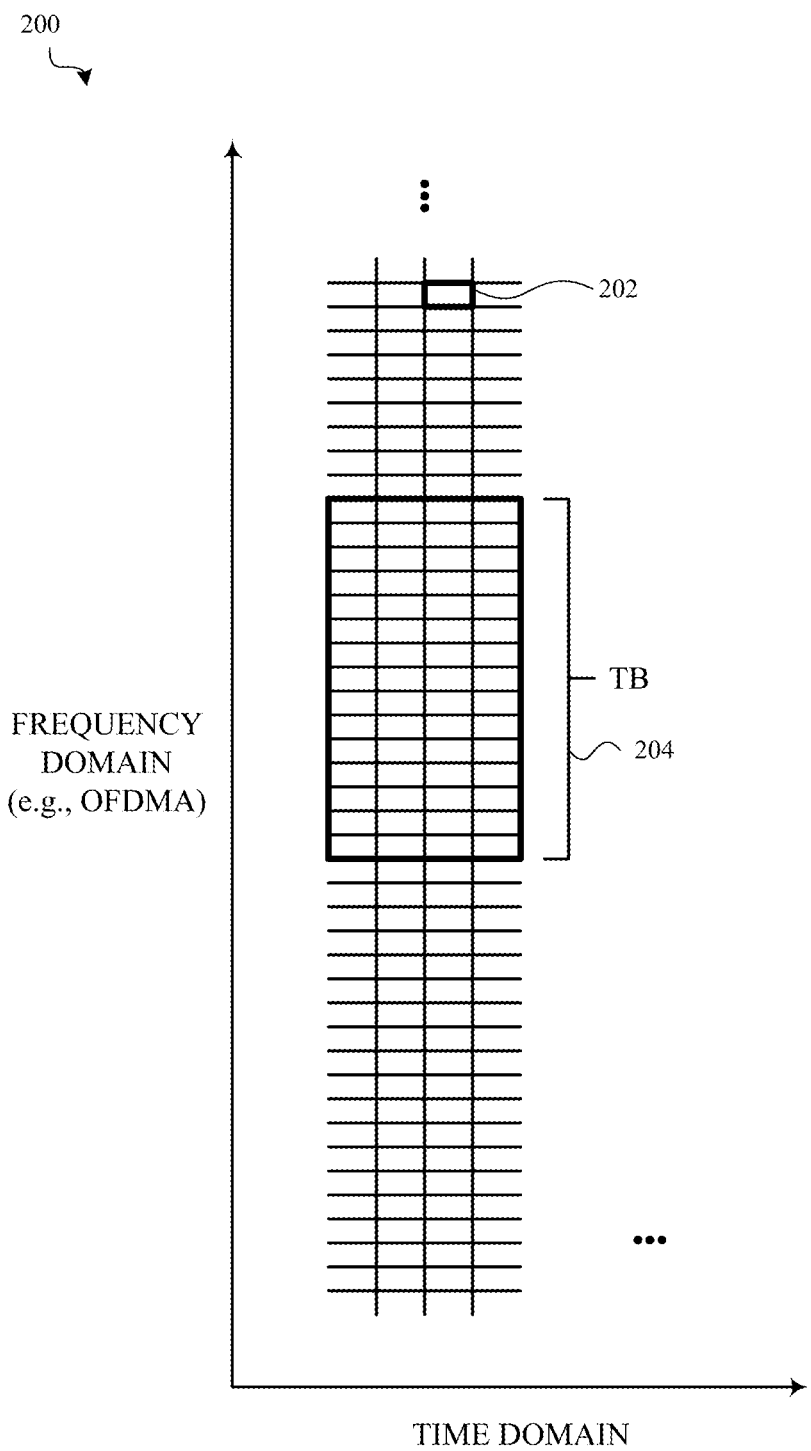
FIG. 2 shows a set of time and frequency resources that define an example set of resource elements and one or more transport blocks.

FIG. 2 shows a set of time and frequency resources 200 that define an example set of REs 202 and one or more TB s 204. When the TB is used for a set of NOMA transmissions, each RE 202 of a TB 204, or different subsets of REs 202 of the TB 204, may be used to transmit a set of bit sequences, of a set of multiplexed NOMA transmissions, to/from a set of wireless devices. Described herein are various MAC architectures for configuring, encoding, modulating, and transmitting such a set of multiplexed NOMA transmissions.

Figure 3:
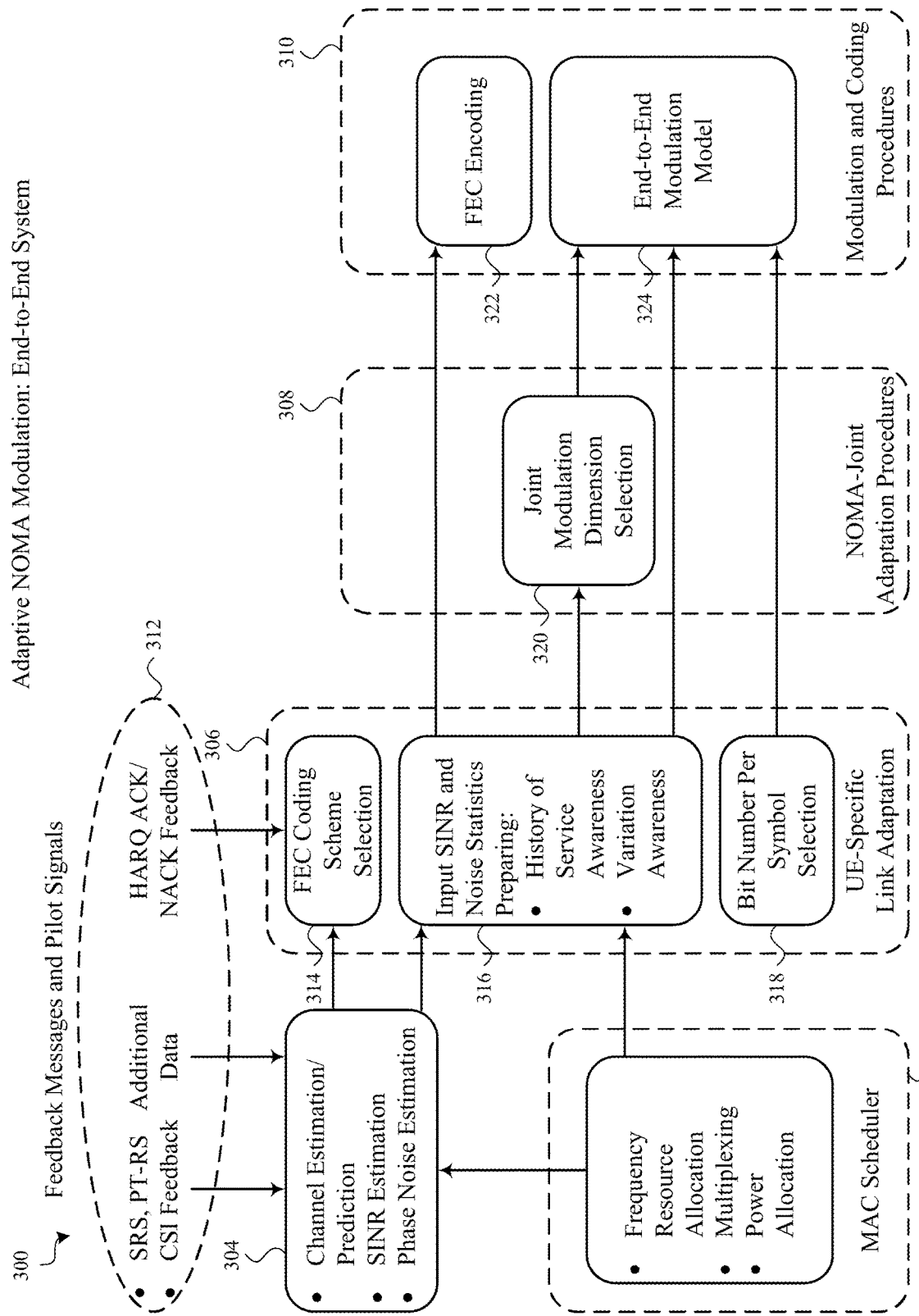
FIG. 3 shows an example MAC architecture that uses end-to-end adaptive NOMA modulation.
Figure 6:
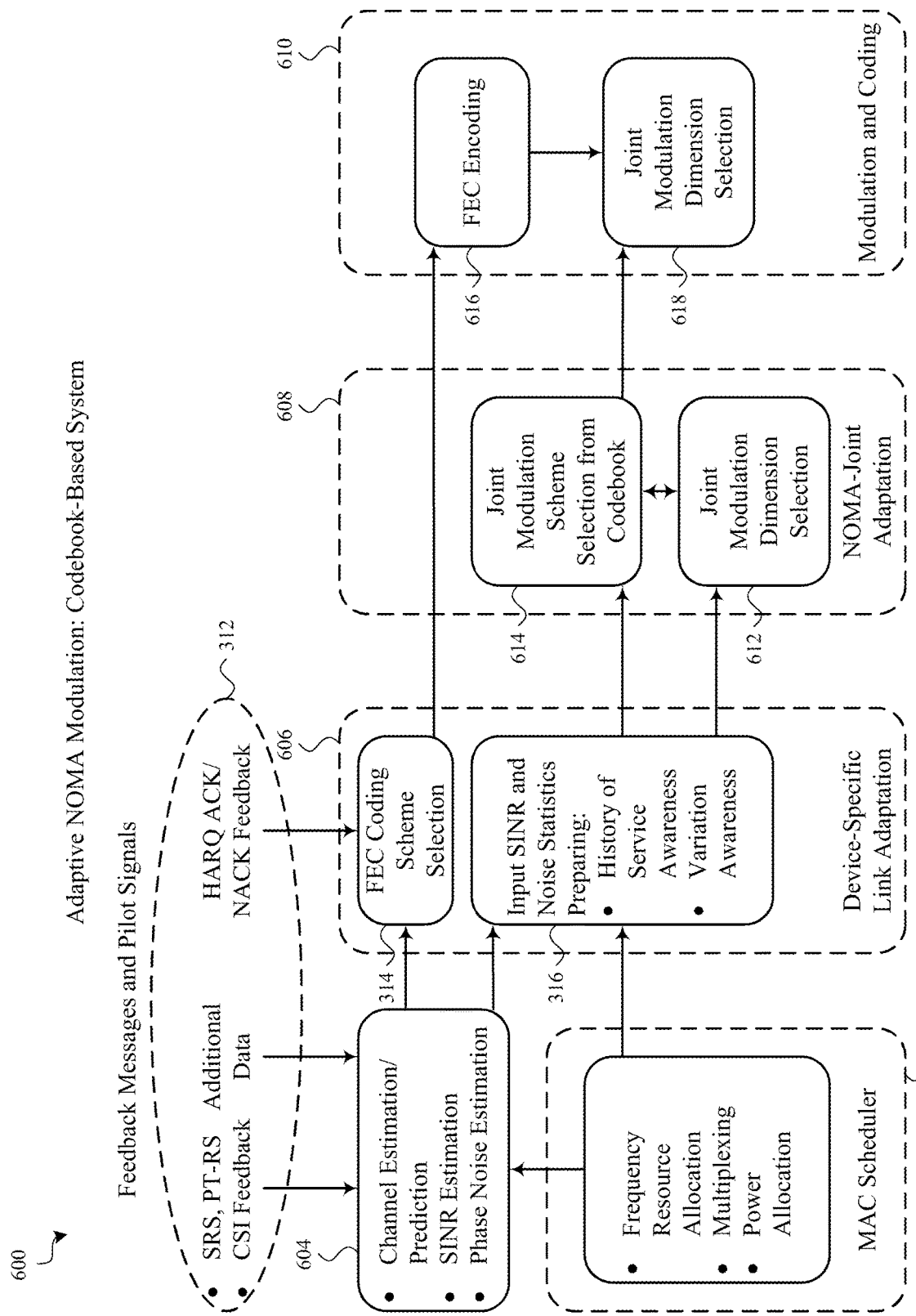
FIG. 6 shows an example MAC architecture that uses codebook-based adaptive NOMA modulation.

FIGS. 3 and 6 show example MAC architectures for adaptive NOMA modulation. FIG. 3 shows an example MAC architecture 300 that uses end-to-end adaptive NOMA modulation, and FIG. 6 shows an example MAC architecture 600 that uses codebook-based adaptive NOMA modulation.

The MAC architecture 300 of FIG. 3 includes various functional blocks of a medium access control (MAC) layer, including a MAC scheduler block 302, a parameter estimation block 304, a device-specific link adaptation block 306, a NOMA joint adaptation block 308, and a modulation and coding block 310. The blocks 302-310 define logical groupings of functions that may be performed by a device. The device may be a base station, UE, or other wireless device that implements the MAC architecture 300. The functions of the different blocks 302-310 may be performed by the same or different components (e.g., the same or different processors) of a device.

The operations of the MAC scheduler block 302 may include determining a set of resources that is to be used for a set of multiplexed NOMA transmissions. For example, a MAC scheduler may allocate a set of frequency resources (i.e., determine a frequency resource allocation) for a TB that will include the set of multiplexed NOMA transmissions. The MAC scheduler may also determine a set of wireless devices that will transmit (e.g., on a UL or sidelink) or receive (e.g., on a DL or sidelink) the set of multiplexed NOMA transmissions (e.g., the set of multiplexed UL, DL, or sidelink NOMA transmissions) on the set of resources, and may determine a power allocation for the set of multiplexed NOMA transmissions. The set of multiplexed NOMA transmissions may be transmitted or received by the device that incorporates the MAC architecture 300, or by a wireless device that is configured to transmit or receive by the device that incorporates the MAC architecture 300. The outputs of the MAC scheduler block 302 (or MAC scheduler) may be provided to the parameter estimation block 304 and the device-specific link adaptation block 306. In some embodiments, the set of wireless devices may be in wireless communication over one or more D2D communication channels, and the device that incorporates the MAC architecture 300 may be a master device and/or one of the wireless devices in the set of wireless devices.

At the parameter estimation block 304, a channel on which a TB will be transmitted may be estimated, or channel conditions may be otherwise predicted. The operations of the parameter estimation block 304 may also include estimating an SINR. In some embodiments, the SINR may be estimated based on interference and multiplexing awareness for the set of wireless devices that will transmit or receive the set of multiplexed NOMA transmissions, as determined at the MAC scheduler block 302. In some embodiments, the operations of the parameter estimation block 304 may also or alternatively include estimating phase noise or performing other parameter estimations (e.g., other noise estimations). The parameter estimation block 304 may perform its estimates in response to various feedback messages or pilot signals 312. When the MAC architecture 300 is implemented by a base station, the parameter estimation block 304 may in some cases perform its estimates in response to measurements of sounding reference signals (SRSs) or phase tracking reference signals (PT-RSs) received from the set of wireless devices determined by the MAC scheduler block 302 (and/or other devices), or in response to channel state information (CSI) feedback received from the set of wireless devices determined by the MAC scheduler block 302 (and/or other wireless devices). The parameter estimation block 304 may also or alternatively perform its estimates in response to additional data, such as sensing data, velocity estimations, and so on.

The operations performed at the device-specific link adaptation block 306 may be performed per individual wireless device (e.g., by the UEs or other wireless devices that are determined to transmit or receive a NOMA transmission of the set of multiplexed NOMA transmissions), which is typically equivalent to performing the operations per individual NOMA transmission of the set of multiplexed NOMA transmissions. The operations at block 306 may include selecting, per individual wireless device and at 314, a forward error correction (FEC) coding scheme (e.g., a redundancy for channel coding) to be used for each NOMA transmission of the set of multiplexed NOMA transmissions. Each FEC coding scheme may be selected, for example, in response to a channel estimation or prediction for a channel on which a NOMA transmission is transmitted or received (and/or in response to hybrid automatic repeat request (HARQ) acknowledgment (ACK) or non-acknowledgement (NACK) feedback, or other feedback or signals).

The operations at block 306 may also include a computation (or determination) of SINR statistics or other noise statistics, and optionally channel statistics (e.g., at 316). The statistics may be computed in response to estimations received from block 304 and may include, for example, a history of service awareness, variation awareness, or other statistics (e.g., other noise statistics). The statistics may include, for example, mean values, ranges of values (e.g., variances), or other statistics.

Other operations performed at block 306 include selecting, at 318, a number of bits per symbol (or constellation) for each wireless device that is determined, at block 302, to transmit or receive a NOMA transmission of the set of multiplexed NOMA transmissions. The number of bits per symbol is a selection of how many bits will be encoded per symbol for a particular wireless device (i.e., per individual wireless device) that is transmitting or receiving a NOMA transmission in the set of multiplexed NOMA transmissions.

In some embodiments, the FEC coding scheme and number of bits per symbol may be selected, for a wireless device, using a modulation and coding scheme (MCS) selection technique, such as outer loop link adaptation (OLLA).

The operations performed at the NOMA joint adaptation block 308 may be performed for all wireless devices jointly (e.g., for all of the UEs or other wireless devices that are determined to transmit or receive a NOMA transmission of the set of multiplexed NOMA transmissions). The operations may include selecting a joint modulation dimension (e.g., a number of constellation points in a symbol) at 320. The joint modulation dimension may be selected in response to the statistics determined at block 306.

When the device that includes the MAC architecture 300 is configured to transmit the set of multiplexed NOMA transmissions to the set of wireless devices determined at block 302, the device may include the modulation and coding block 310. The operations performed at block 310 may include, at 322, FEC encoding a set of bit sequences corresponding to the set of multiplexed NOMA transmissions (e.g., encoding each bit sequence in the set of bit sequences in accord with a respective FEC coding scheme selected at block 306). The FEC encoded bit sequences may be input to an end-to-end modulation model at 324. The end-to-end modulation model may also receive, as inputs, the selected joint modulation dimension, the statistics (e.g., noise statistics) computed at block 306, and the selected number of bits per symbol for each wireless device that will transmit or receive a NOMA transmission of the set of multiplexed NOMA transmissions. The end-to-end modulation model may be a model that is trained, using machine learning (ML) (e.g., artificial intelligence (AI)), for different combinations of joint modulation dimension, statistics, selected numbers of bits per symbol, and numbers of wireless devices that are transmitting or receiving the set of multiplexed NOMA transmissions. In some embodiments, the end-to-end modulation model may be trained using a loss function, such as a target bit error rate (BER). End-to-end demodulation models may be trained in the same way, or similarly, and in some embodiments may be trained at the same time as the end-to-end modulation model. All of the models may be trained offline.

The end-to-end modulation model may output a symbol (e.g., a multidimensional complex value) to a physical (PHY) layer pipeline. The PHY layer pipeline may output, via a wireless transceiver, an adaptively modulated set of multiplexed NOMA transmissions including the symbol.

The device that includes the MAC architecture 300 may further transmit, to each wireless device of the set of wireless devices receiving the set of multiplexed NOMA transmissions, a first indication of the selected FEC coding scheme (e.g., an FEC coding scheme index) for the wireless device and a second indication of the selected number of bits per symbol for the wireless device. The first and second indications may be used to appropriately configure an end-to-end modulation model of the wireless device, and in some embodiments may be transmitted in DCI.

When the device that includes the MAC architecture 300 is configured to receive the set of multiplexed NOMA transmissions from the set of wireless devices determined at block 302, the end-to-end modulation model may alternatively receive a symbol (e.g., a multidimensional complex value) and demodulate the multidimensional complex value into a set of FEC encoded bit sequences. The set of FEC encoded bit sequences may be provided to an FEC decoder.

When the device that includes the MAC architecture 300 is configured to receive the set of multiplexed NOMA transmissions, the device may also transmit, to each wireless device of the set of wireless devices transmitting a NOMA transmission of the set of multiplexed NOMA transmissions, a first indication of the selected FEC coding scheme for the wireless device (e.g., an FEC coding scheme index), a second indication of the selected number of bits per symbol for the wireless device, and one or more indications of the statistics computed at block 306. The first and second indications and statistics may be used to appropriately configure an end-to-end modulation model of the wireless device, and in some embodiments may be transmitted in UCI.

In other embodiments, the device that includes the MAC architecture 300 may configure a set of multiplexed NOMA transmissions between other wireless devices and may not transmit or receive the set of multiplexed NOMA transmissions. In these embodiments, the device may transmit, to each wireless device of the set of wireless devices transmitting or receiving the set of multiplexed NOMA transmissions, a first indication of the selected FEC coding scheme for the wireless device (e.g., an FEC coding scheme index), a second indication of the selected number of bits per symbol for the wireless device and, if the device is a transmitter, one or more indications of the statistics computed at block 306.

Figure 4:
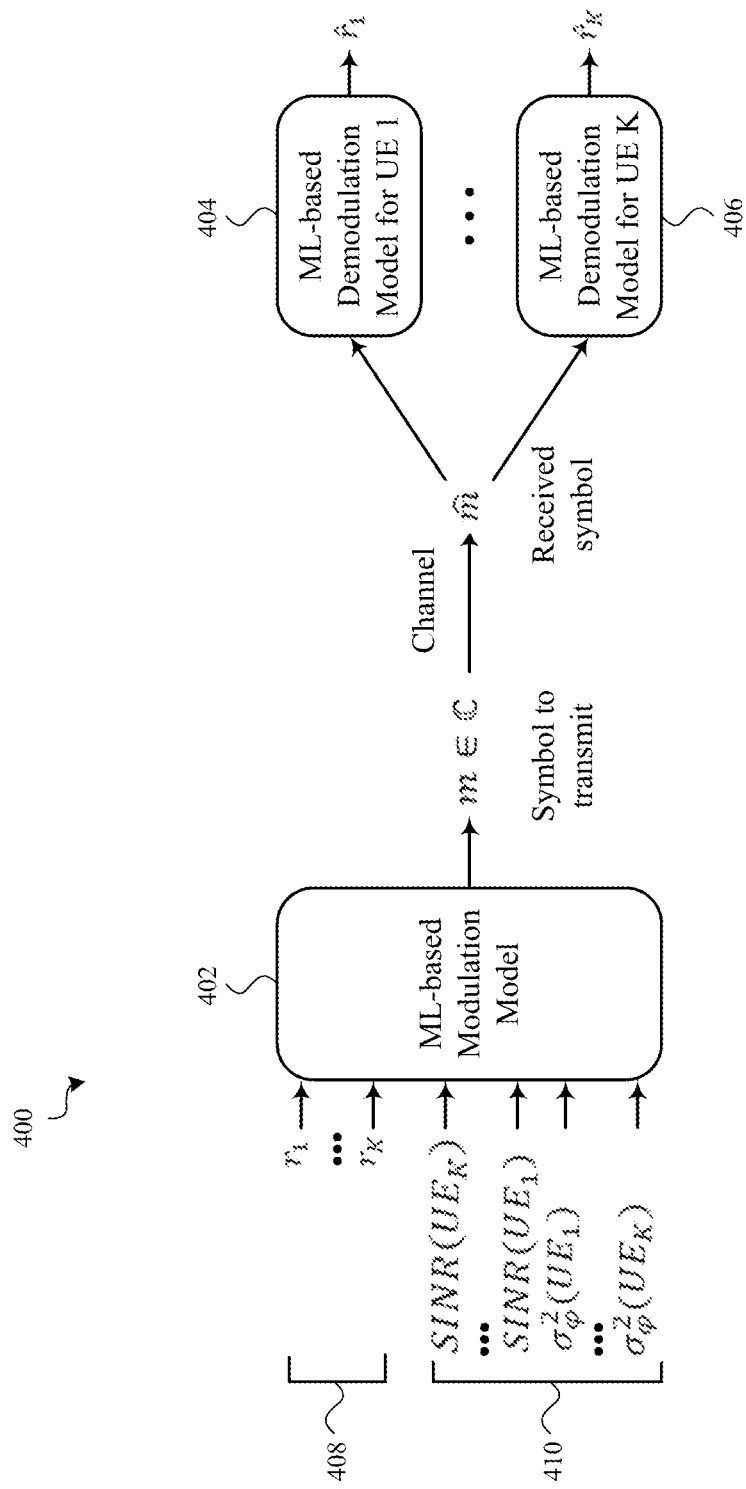
FIG. 4 shows an example of NOMA modulation and parallel demodulation for a set of multiplexed NOMA transmissions.

FIG. 4 shows an example 400 of NOMA modulation and parallel demodulation for a set of multiplexed NOMA transmissions, including the interface between an ML-based modulation model 402 of a transmitting device and respective ML-based demodulation models 404, 406 of a set of receiving devices. The ML-based modulation model 402 may be configured similarly to the end-to-end modulation model described with reference to FIG. 3, and each of the ML-based demodulation models 404, 406 may be trained and configured in the same way as, or similarly to, the ML-based modulation model 402 (e.g., as described with reference to FIG. 3).

The ML-based modulation model 402 may receive, as input, a set of K bit sequences 408 ($r_1, \ldots, r_K$) for a set of K wireless devices that will receive a set of K multiplexed NOMA transmissions based on the K bit sequences. In some embodiments, the bit sequences 408 may be FEC encoded bit sequences. Each bit sequence $r_i$, where i=1, . . . , K, may include a number of bits per symbol that has been selected for a particular wireless device of the set of wireless devices that receive the set of multiplexed NOMA transmissions. The ML-based modulation model 402 may also receive, as input, SINR statistics 410 (e.g., SINR($UE_1$), SINR($UE_K$)) or other noise statistics (e.g., as generated by the device-specific link adaptation block in FIG. 3, such as phase noise statistics (e.g., $\sigma_\varphi^2(UE_1)$, $\sigma_\varphi^2(UE_K)$)), and optionally channel statistics.

The ML-based modulation model 402 may generate one or more symbols, m (e.g., one or more multidimensional complex values defined by a set of constellation points (e.g., ($b_1, \ldots, b_K$)), and may transmit the symbol(s) via a wireless transceiver. The symbol(s) may define the set of multiplexed NOMA transmissions.

Each wireless device of a set of wireless devices that receives the set of multiplexed NOMA transmissions (e.g., via a respective wireless transceiver) may host or access a respective one of the ML-based demodulation models 404, 406, and may receive the set of multiplexed NOMA transmissions. The ML-based demodulation models 404, 406 may be provided to the wireless devices prior to the set of multiplexed NOMA transmissions being transmitted, and in some embodiments may be standardized ML-based demodulation models. Also prior to the set of multiplexed NOMA transmissions being transmitted, the wireless devices that receive the set of multiplexed NOMA transmissions may receive a first indication of the selected FEC coding scheme for the wireless device and a second indication of the selected number of bits per symbol for the wireless device (e.g., an FEC coding scheme index). Each wireless device may also receive an index indicating a device or NOMA transmission "order." For example, one wireless device may be assigned device order number 1, another wireless device may be assigned device order number 2, and so on. The first and second indications, and index indicating a device order number, may be received by a wireless device in DCI. The first and second indications may be used by a wireless device, along with its device order number, to appropriately configure its respective ML-based demodulation model 404, 406.

A transmitted symbol, m, may be received at a wireless device as a received symbol, m̂. Each wireless device may demodulate the symbol, in response to its uniquely configured ML-based demodulation model, to extract a respective bit sequence $\hat{r}_i$, where i=1, . . . , K. In some embodiments, the extracted bit sequences may be FEC encoded bit sequences. Each wireless device may perform its demodulation in parallel.

Figure 5:
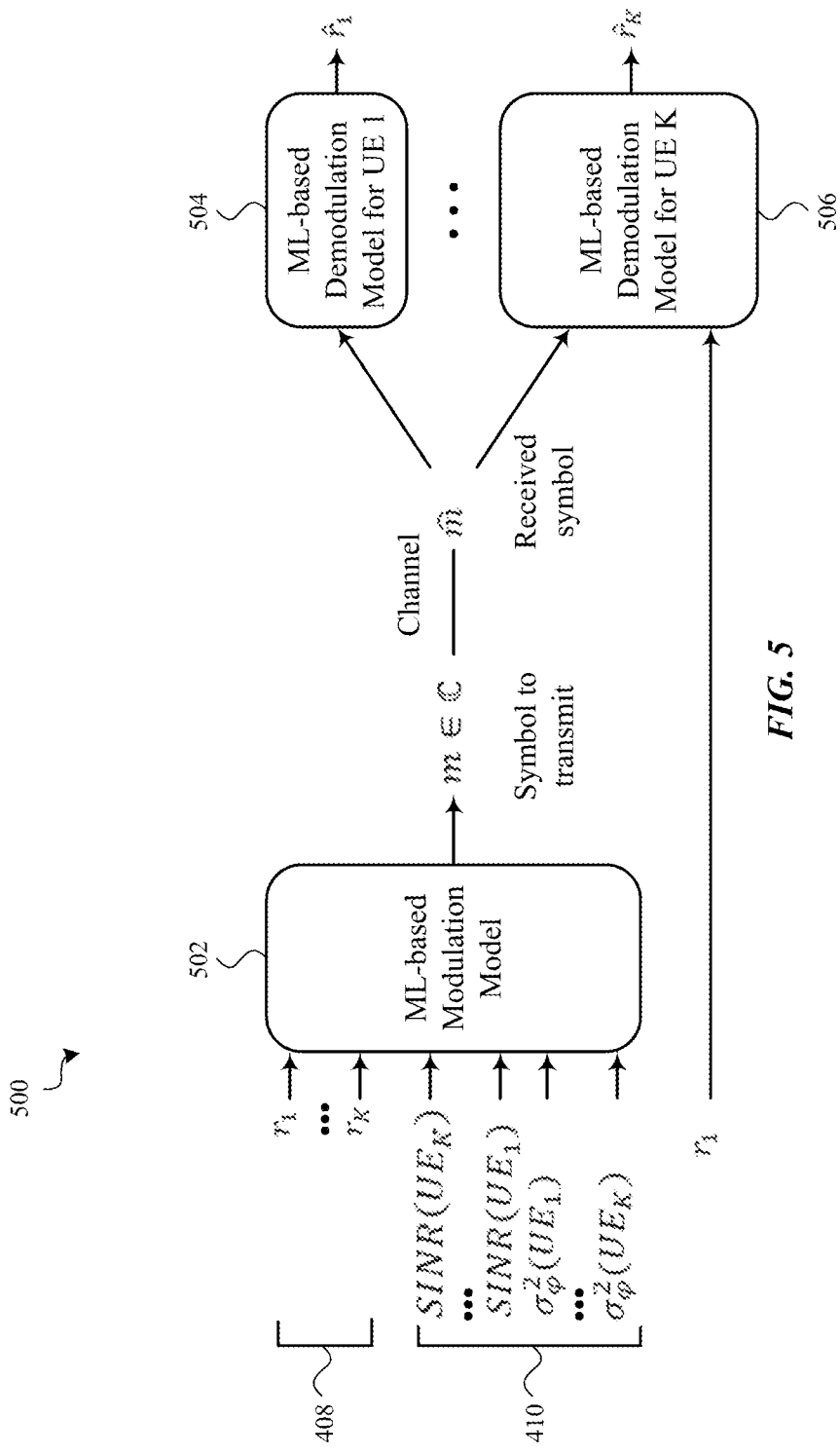
FIG. 5 shows an example of NOMA modulation and successive interference cancelation (SIC) demodulation for a set of multiplexed NOMA transmissions.

FIG. 5 shows an example 500 of NOMA modulation and successive interference cancelation (SIC) demodulation for a set of multiplexed NOMA transmissions, including the interface between an ML-based modulation model 502 of a transmitting device and respective ML-based demodulation models 504, 506 of a set of receiving devices. The ML-based modulation model 502 may be configured similarly to the end-to-end modulation model described with reference to FIG. 3, and each of the ML-based demodulation models 504, 506 may be trained and configured in the same way as, or similarly to, the ML-based modulation model 502 (e.g., as described with reference to FIG. 3). However, the ML-based demodulation model 504 may need to be provided the output of the ML-based demodulation model 506 during training, for reasons that will be made clear below.

Similar to what is shown in FIG. 4, the ML-based modulation model 502 may receive, as input, a set of K bit sequences $r_1, \ldots, r_K$) for a set of K wireless devices that will receive a set of K multiplexed NOMA transmissions based on the K bit sequences. In some embodiments, the bit sequences may be FEC encoded bit sequences. Each bit sequence $r_i$, where i=1, . . . , K, may include a number of bits per symbol that has been selected for a particular wireless device of the set of wireless devices that receive the set of multiplexed NOMA transmissions. The ML-based modulation model 502 may also receive, as input, SINR statistics (e.g., SINR($UE_1$), SINR($UE_K$)) or other noise statistics (e.g., as generated by the device-specific link adaptation block in FIG. 3, such as phase noise statistics (e.g., $\sigma_\varphi^2(UE_1)$, $\sigma_\varphi^2(UE^K)$)), and optionally channel statistics. In contrast to what is described in FIG. 4, however, the ML-based modulation model 502 may generate one or more symbols, m (e.g., one or more multidimensional complex values defined by a set of constellation points (e.g., ($b_1, \ldots, b_K$)) based on SIC and transmit the symbol(s) via a wireless transceiver. The symbol(s) may define the set of multiplexed NOMA transmissions.

Each wireless device of a set of wireless devices that receives the set of multiplexed NOMA transmissions (e.g., via a respective wireless transceiver) may host or access a respective one of the ML-based demodulation models 504, 506, and may receive the set of multiplexed NOMA transmissions. The ML-based demodulation models 504, 506 may be provided to the wireless devices prior to the set of multiplexed NOMA transmissions being transmitted, and in some embodiments may be standardized ML-based demodulation models. Also prior to the set of multiplexed NOMA transmissions being transmitted, the wireless devices that receive the set of multiplexed NOMA transmissions may receive a first indication of the selected FEC coding scheme for the wireless device (e.g., an FEC coding scheme index) and a second indication of the selected number of bits per symbol for the wireless device. Each wireless device may also receive an index indicating a device or NOMA transmission "order." The first and second indications, and index indicating a device order number, may be received by a wireless device in DCI. The first and second indications may be used by a wireless device, along with its device order number, to appropriately configure its respective ML-based demodulation model 504, 506.

A transmitted symbol, m, may be received at a wireless device as a received symbol, in. Each wireless device may demodulate the symbol, in response to its uniquely configured ML-based demodulation model, to extract a respective bit sequence $\hat{r}_i$, where i=1, . . . , K. In some embodiments, the extracted bit sequences may be FEC encoded bit sequences. The first wireless device (i.e., the device assigned device order number 1) may demodulate and extract bit sequence $\hat{r}_1$, using ML-based demodulation model 404, without further input. However, the second wireless device (i.e., the device assigned device order number 2) may need to demodulate bit sequence $\hat{r}_1$ using ML-based demodulation model 406, and then demodulate bit sequence $\hat{r}_2$ using bit sequence $\hat{r}_1$ as an additional input. A third wireless device, if any, would need to receive $\hat{r}_1$ and $\hat{r}_2$ as additional inputs to its ML-based demodulation model. In some embodiments, $\hat{r}_1$ may be provided to the ML-based demodulation model 406 by the transmitting devices, or by the first wireless device, instead of the second wireless device having to demodulate $\hat{r}_1$.

The MAC architecture 600 of FIG. 6 includes various functional blocks of a MAC layer, including a MAC scheduler block 602, a parameter estimation block 604, a device-specific link adaptation block 606, a NOMA joint adaptation block 608, and a modulation and coding block 610. The blocks 602-610 define logical groupings of functions that may be performed by a device. The device may be a base station, UE, or other wireless device that implements the MAC architecture 600. The functions of the different blocks 602-610 may be performed by the same or different components (e.g., the same or different processors) of a device.

The operations performed at the MAC scheduler block 602, parameter estimation block 604, and device-specific link adaptation block 606 may be the same as, or similar to, the operations described with reference to FIG. 3. However, the operations performed at the device-specific link adaptation block 606 need not include a selection of a number of bits per symbol for each wireless device that is determined to transmit or receive a NOMA transmission of the set of multiplexed NOMA transmissions.

The operations performed at the NOMA joint adaptation block 608 may be performed for all wireless devices jointly (e.g., for all of the UEs or other wireless devices that are determined to transmit or receive a NOMA transmission of the set of multiplexed NOMA transmissions). The operations may include selecting a joint modulation dimension (e.g., a number of constellation points in a symbol) at 612. The joint modulation dimension may be selected in response to the statistics determined at block 606. The operations may also include selecting, from a codebook and at 614, a joint modulation scheme to be used for the set of multiplexed NOMA transmissions. The joint modulation scheme may be selected in response to the statistics determined at block 606 and the selected joint modulation dimension (or the joint modulation dimension and joint modulation scheme may be jointly selected in response to the statistics determined at block 606).

When the device that includes the MAC architecture 600 is configured to transmit the set of multiplexed NOMA transmissions to the set of wireless devices determined at block 602, the device may include the modulation and coding block 610. The operations performed at block 610 may include, at 616, FEC encoding a set of bit sequences corresponding to the set of multiplexed NOMA transmissions. The FEC encoded bit sequences may then be jointly mapped to a symbol (or constellation point), in accord with the selected joint modulation scheme, at 618. The symbol generated as a result of the mapping (e.g., a multidimensional complex value) may be output to a PHY layer pipeline. The PHY layer pipeline may output, via a wireless transceiver, an adaptively modulated set of multiplexed NOMA transmissions including the symbol.

The device that includes the MAC architecture 600 may further transmit, to each wireless device of the set of wireless devices receiving the set of multiplexed NOMA transmissions, a first indication of the selected FEC coding scheme for the wireless device (e.g., an FEC coding scheme index) and a second indication of the selected joint modulation scheme (e.g., a codebook index). The first and second indications may be used to appropriately configure a demodulator of the wireless device, and may replace a legacy MCS index. In some embodiments, the first and second indications may be transmitted in DCI.

When the device that includes the MAC architecture 600 is configured to receive the set of multiplexed NOMA transmissions from the set of wireless devices determined at block 602, block 610 may alternatively include a joint demodulator for receiving a symbol (e.g., a multidimensional complex value) and demodulating the multidimensional complex value into a set of FEC encoded bit sequences. The set of FEC encoded bit sequences may be provided to an FEC decoder.

When the device that includes the MAC architecture 600 is configured to receive the set of multiplexed NOMA transmissions, the device may also transmit, to each wireless device of the set of wireless devices transmitting a NOMA transmission of the set of multiplexed NOMA transmissions, a first indication of the selected FEC coding scheme for the wireless device (e.g., an FEC coding scheme index), and a second indication of the selected joint modulation scheme (e.g., a codebook index). The first and second indications may be used to appropriately map a bit sequence of the wireless device to a symbol, and in some embodiments may be transmitted in UCI.

In other embodiments, the device that includes the MAC architecture 600 may configure a set of multiplexed NOMA transmissions between other wireless devices and may not transmit or receive the set of multiplexed NOMA transmissions. In these embodiments, the device may transmit, to at least one (or each) wireless device of the set of wireless devices transmitting or receiving the set of multiplexed NOMA transmissions, a first indication of the selected FEC coding scheme for the wireless device (e.g., an FEC coding scheme index), and a second indication of the selected joint modulation scheme (e.g., a codebook index).

The joint modulation scheme used by the MAC architecture described with reference to FIG. 6 may be defined as a unique pair (M, Map) within a codebook, where M is a finite set of constellation points on the complex plane (i.e., M∈ $\mathbb{C}^{N_1 \cdot N_2 \cdot \ldots \cdot N_K}$); K is a number of wireless devices participating in the joint modulation; $N_i=2^{b_i}$; and $b_i$ is the number of bits modulated by a single symbol for a wireless device i. Map is a one-to-one map of concatenation of all possible bit sequences of size $b_i \forall i=1, \ldots, K$ to the finite set of constellation points, M, such that:

$$Map: \{0,1\}^{b_1} \times \{0,1\}^{b_2} \times \ldots \times \{0,1\}^{b_K} \to M$$

Figure 7:
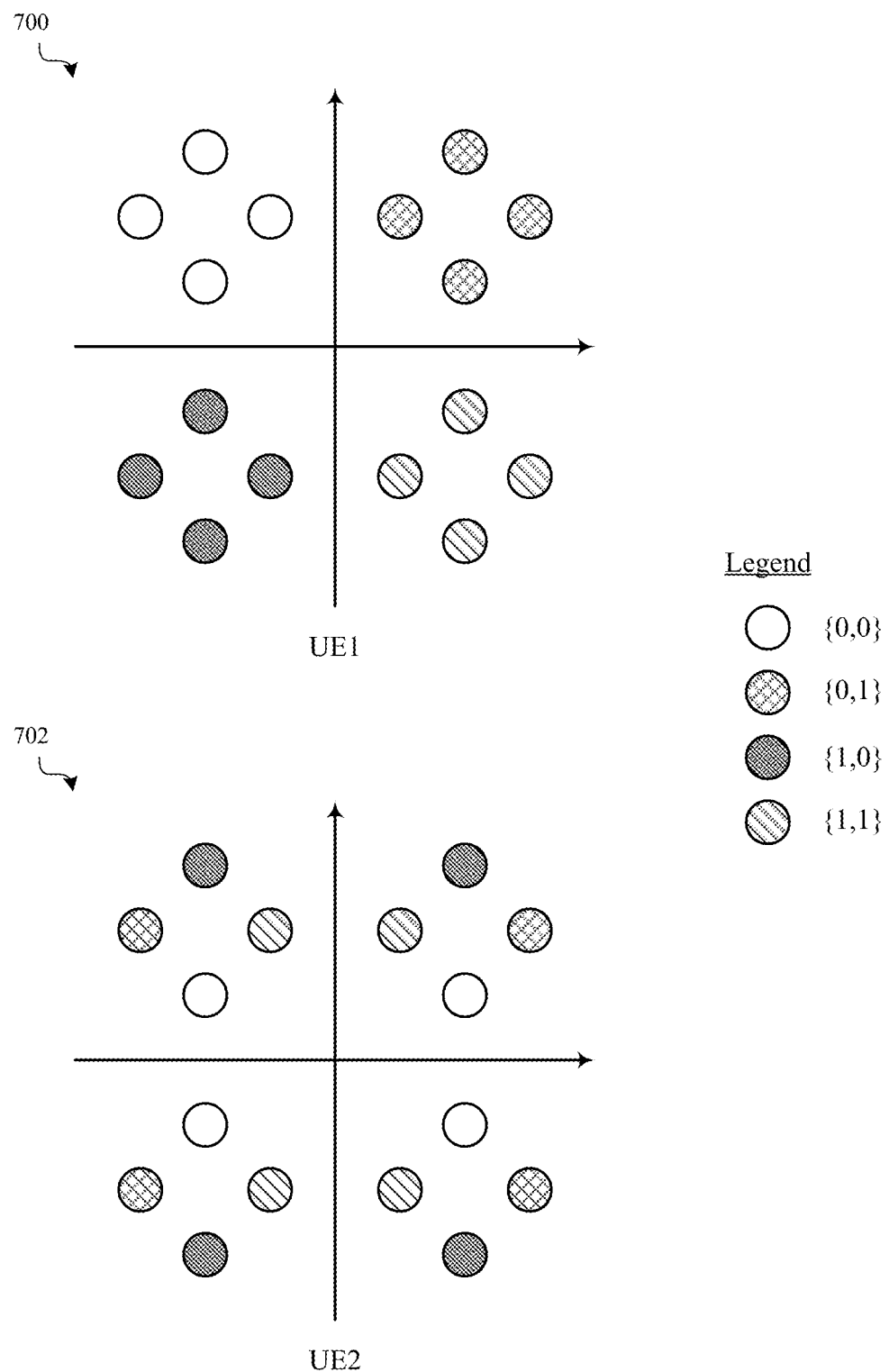
FIG. 7 graphically illustrates an example mapping of 2-bit sequences to a set of sixteen constellation points in a complex plane.

FIG. 7 graphically illustrates an example mapping of 2-bit sequences to a set of sixteen constellation points in a complex plane. For a first user of K users (e.g., UE1), the 2-bit sequence may be mapped to one of a first four subsets of the sixteen constellation points, depending on whether the bit sequence is {0,0}, {0,1}, {1,0}, or {1,1}. See, e.g., graph 700 in a complex (e.g., IQ) plane. For a second user of the K users (e.g., UE2), the 2-bit sequence may be mapped to one of a second four subsets of the sixteen constellation points. See, e.g., graph 702 in the complex plane. The first four subsets differ; the second four subsets differ; and the second four subsets differ from the first four subsets.

Demodulation of a joint modulation scheme can be performed in different ways. For example, consider a symbol $y_i$, transmitted to and received by wireless device i. In accord with a first demodulation scheme, each wireless device i may look for the closest constellation point in M, then demodulate it to the joint demodulation sequence and take its part. For example, a wireless device i may scan a complex space for a constellation point associated with a bit sequence of a NOMA transmission targeted for the wireless device i, and then demodulate the constellation point. In accord with a second demodulation scheme, the complex plane may be divided into $N_i = 2^{b_i}$ regions for each wireless device i, where each region corresponds to a particular bit sequence for wireless device i. A wireless device i may be provided an algorithmic way to identify the regions. Upon identifying a region including a constellation point associated with a bit sequence of a NOMA transmission, the wireless device i may demodulate the constellation point in the region. In accord with a third demodulation scheme, bit sequences may be sequentially demodulated. For example, a wireless device i may demodulate its bit sequence given the known demodulation result of one or more wireless devices having lower assigned device orders (i.e., wireless devices 1 to i−1). For example, a wireless device i may use the demodulation result of a set of one or more wireless devices to determine a constellation point associated with a bit sequence of a NOMA transmission targeted for the wireless device i, and the wireless device i may then demodulate the constellation point.

Figure 8:
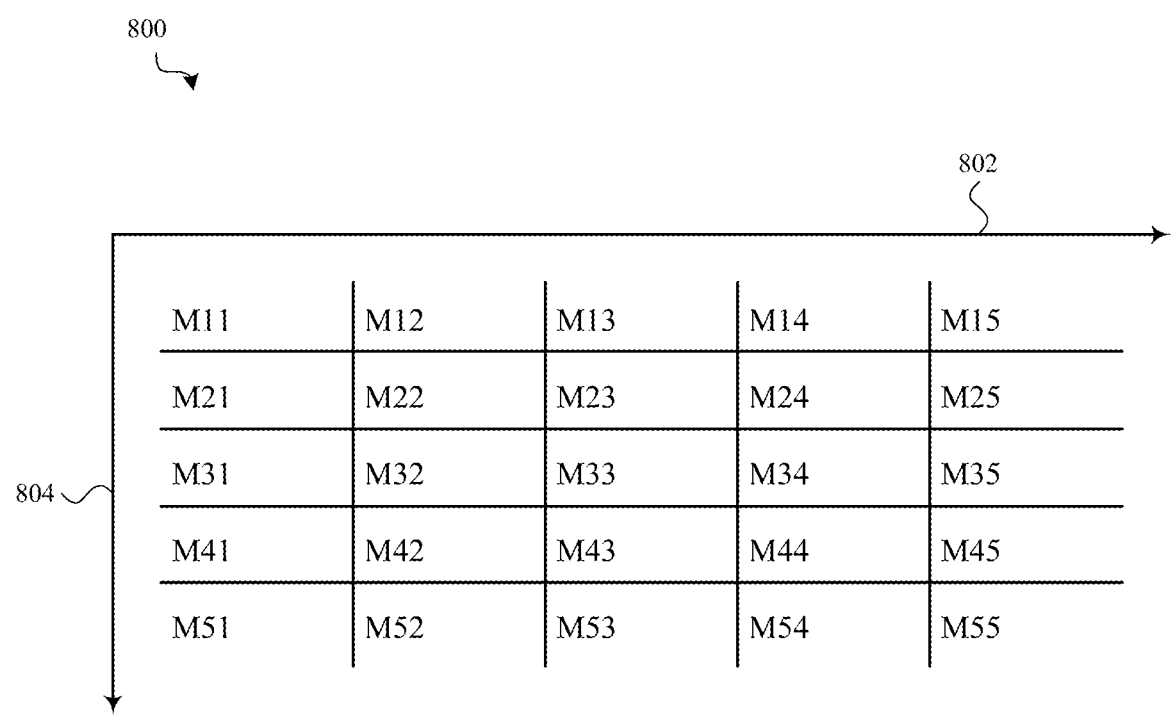
FIG. 8 shows an example codebook of joint modulation schemes for two wireless devices that transmit or receive a set of multiplexed NOMA transmissions.

FIG. 8 shows an example codebook 800 of joint modulation schemes for two wireless devices that transmit or receive a set of multiplexed NOMA transmissions. Decreasing values or ranges of SINR for a first wireless device are represented by the x-axis 802, and decreasing values or ranges of SINR for a second wireless device are represented by the y-axis 804. After determining an SINR value for each wireless device, a joint modulation scheme (e.g., one of M11, M34, and so on) may be selected for the first and second wireless devices.

Although the codebook 800 shown in FIG. 8 is for K=2 wireless devices, the codebook 800 may be extended in K≥2 dimensions. In some embodiments, each SINR that is used to index the codebook 800 may represent a discrete SINR value. In other embodiments, each SINR may represent an SINR range. In some embodiments, different SINRs indicated in the codebook 800 may represent uniform or non-uniform ranges.

In some embodiments, the codebook 800 may be computed (or pre-defined) offline (e.g., with the aid of an NN-based autoencoder) and standardized. In some embodiments, the codebook 800 may be indexed by a NOMA joint adaptation block, such as the NOMA joint adaptation block described with reference to FIG. 6. In some embodiments, the codebook 800 may be provided to a wireless device, or updated, over one or more of a cellular network, a Wi-Fi network, and so on.

In some embodiments, a codebook may additionally or alternatively depend on statistics other than SINR, such as other noise statistics (e.g., phase noise statistics) or channel statistics. A codebook may therefore be generally defined as a set of joint modulation schemes, $M_i$, as follows:

$$\text{Codebook} := \{M_i : M_i \in \mathbb{C}^{N_1(i) \cdot N_2(i) \cdots N_K(i)} i = 1, \ldots, I\}$$

where I is the size of the codebook, and K is the set of number of wireless devices in a set of wireless devices that is transmitting or receiving a set of multiplexed NOMA transmissions. In order to construct a codebook, an ML-based modulation model such as the one described with reference to FIG. 4 or 5 may be trained, and in some embodiments may be trained using a loss function, such as a target BER. Then, for each i=1, ..., I, the values of SINR and any other statistics (e.g., $\sigma_\psi^2$ for each wireless device, and the bit lengths ($b_1, \ldots, b_s$) of bit sequences ($r_1, \ldots, r_K$) may be fixed and, for the fixed bit sequence lengths and SINR or other noise/channel parameters, all possible bit sequences ($r_1, \ldots, r_K$) may be processed by the ML-based modulation model and the resultant symbols, m, may be preserved. The set of symbols, m, constitute a modulation scheme $M_i$, where the bit mapping of the modulation scheme is defined as: MAP ($r_1, \ldots, r_K$):=m.

Figure 9:
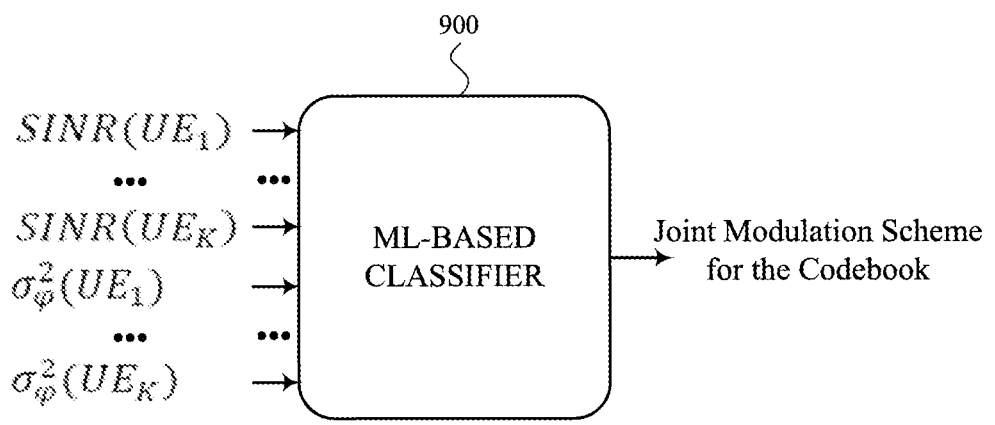
FIG. 9 shows an example ML-based classifier for selecting a joint modulation scheme from a codebook.

FIG. 9 shows an example ML-based classifier 900 for selecting a joint modulation scheme from a codebook. The classifier 900 may receive a set of input parameters (e.g., SINR statistics (e.g., SINR(UE$_1$), ..., SINR(UE$_K$) or other noise statistics (e.g., $\sigma_\varphi^2(UE_1)$, $\sigma_\varphi^2(UE_K)$), and optionally channel statistics) for a set of wireless devices that is configured to transmit or receive a set of multiplexed NOMA transmissions. The statistics may include, for example, mean values (e.g., a mean SINR for the REs of a TB), variances (e.g., a variance of SINR, such as a difference between a maximum value of SINR for a TB and a minimum value of SINR for the TB), and so on. As a function of the input parameters, the ML-based classifier 900 may select a joint modulation scheme from the codebook (e.g., the ML-based classifier 900 may select a joint modulation scheme $M_i$ from Codebook:={$M_i$: $M_i \in \mathbb{C}^{N_1(i) \cdot N_2(i) \cdots N_K(i)} i = 1, \ldots, I$}) and provide a codebook index for the joint modulation scheme. The codebook index may be provided to one or more of the wireless devices that are to transmit or receive the set of multiplexed NOMA transmissions. In some embodiments, the codebook index may be provided to each of the wireless devices. In other embodiments, the codebook index may be provided to one of the wireless devices, and the receiving wireless device may provide the codebook index to the other wireless devices. The codebook index may be provided to a wireless device, for example, in DCI or UCI.

An advantage to codebook-based adaptive NOMA modulation, over end-to-end adaptive NOMA modulation, is that only a codebook and a codebook index need be shared with a set of wireless devices (instead of an ML-based demodulation model).

Figure 10:
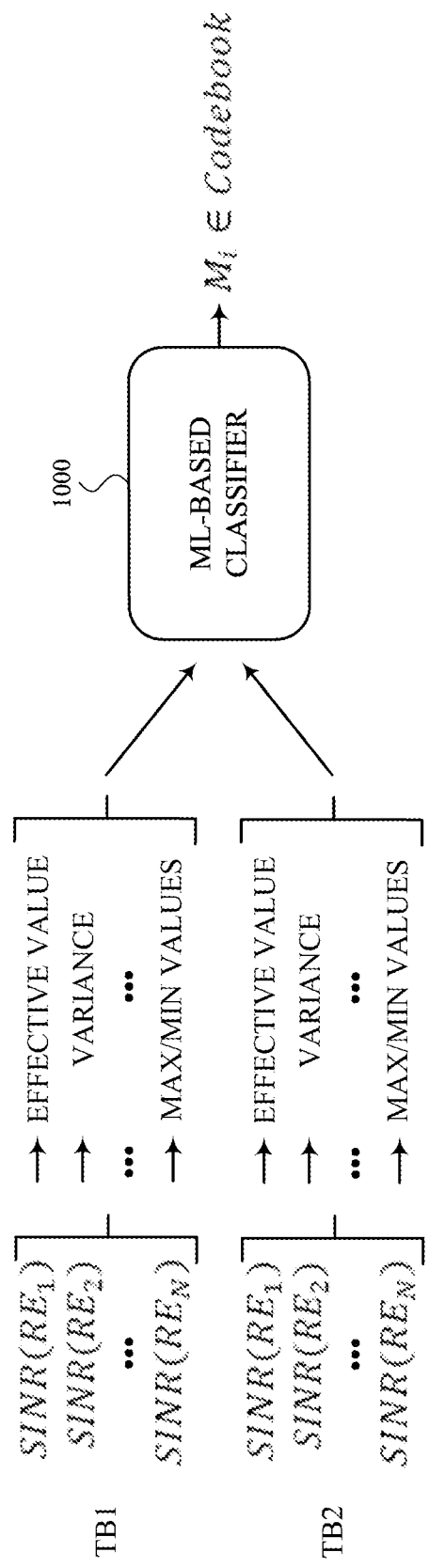
FIG. 10 shows examples of different types of statistics that may be used to train or index an ML-based classifier.

FIG. 10 shows examples of different types of statistics that may be used to train or index an ML-based classifier 1000 that generates a set of joint modulation schemes ($M_i$) for a codebook. By way of example, the statistics are based on SINR. However, in other examples, the statistics may also or alternatively be based on phase noise, channel estimations, and so on.

The statistics shown in FIG. 10 include an effective SINR (e.g., a mean SINR), a variance of SINR, and maximum and minimum values of SINR. Because SINR may vary for the different resource elements (REs) that constitute a TB (e.g., TB1 of a first wireless device, or TB2 of a second wireless device), values of $SINR(RE_1)$, $SINR(RE_2)$, ..., $SINR(RE_N)$ may be determined for each or at least a sampling of the N REs of a TB, and for each wireless device that is to transmit or receive a NOMA transmission in a set of multiplexed NOMA transmissions.

In general, an ML-based classifier's reliance on a greater number of noise or channel statistics tends to improve the quality of joint modulation scheme selection.

Figure 11:
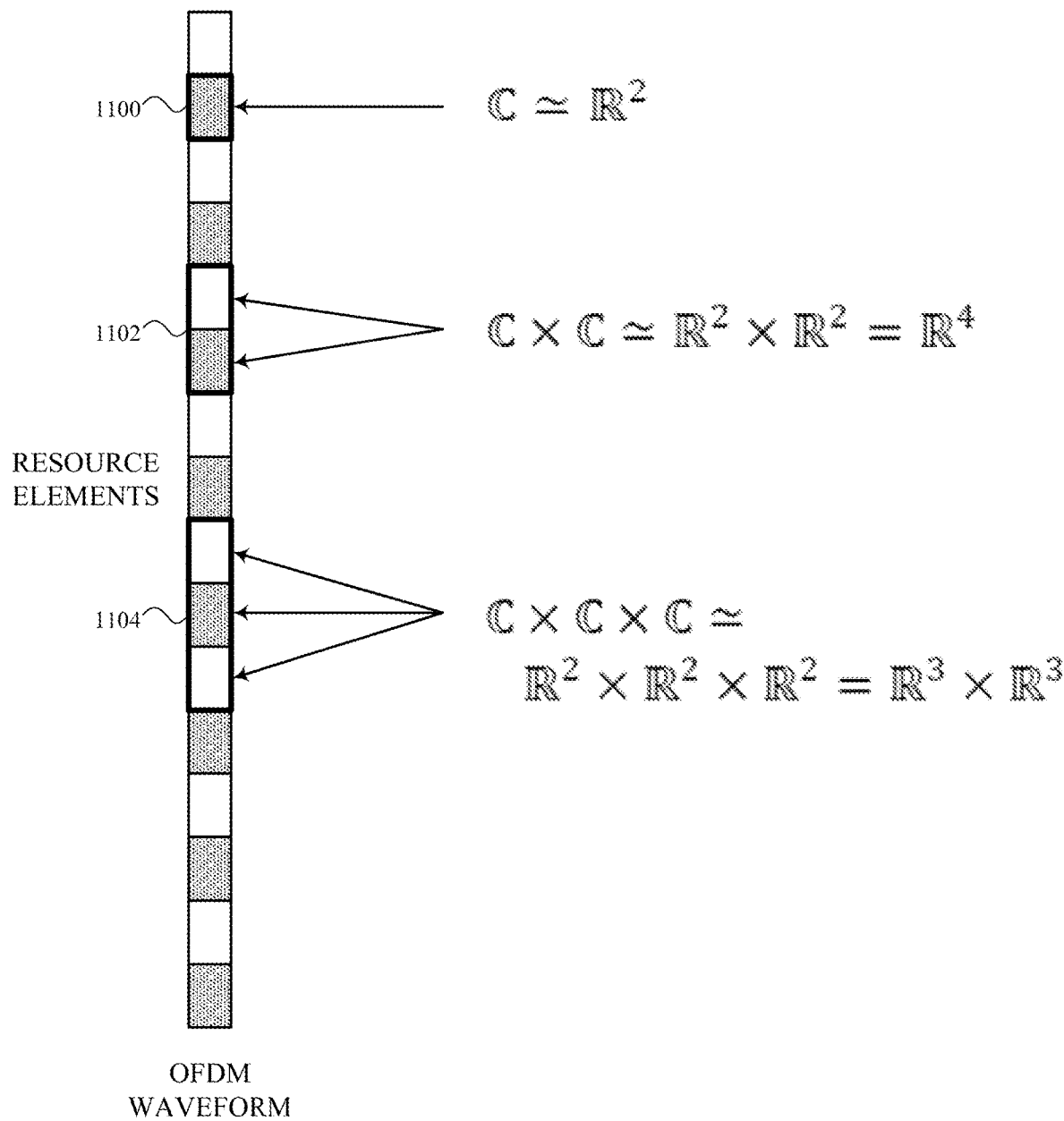
FIG. 11 shows examples of different dimensions that may be used for a joint modulation scheme.

In any of the embodiments described above, the dimension of the joint modulation scheme may vary. As shown in FIG. 11, traditional modulation schemes, such as QAM, map a bit sequence to constellation points in a two-dimensional real space ($\mathbb{R}^2$) or one-dimensional complex space ($\mathbb{C}$), defined by a particular RE 1100 (which RE 1100 is defined by a frequency subcarrier and symbol):

$$\mathbb{C} \simeq \mathbb{R}^2$$

A mapping of one or more bit sequences to such a space is referred to herein as a two-dimensional modulation scheme and, in some cases, may be used to jointly map the bit sequences of two or more wireless devices to a set of constellation points. Alternatively, a joint modulation scheme of higher dimension may be used to map the bit sequences of two or more wireless devices to a set of constellation points.

As also shown in FIG. 11, a set of bit sequences may be jointly mapped to a pair of REs 1102 (e.g., two symbols of the set of bit sequences may be mapped to a pair of REs associated with the same symbol but different subcarriers). Because each RE in the pair of REs has its own complex space, the space into which the set of bit sequences is mapped may be defined as:

$$\mathbb{C} \times \mathbb{C} \simeq \mathbb{R}^2 \times \mathbb{R}^2 = \mathbb{R}^4$$

A mapping of a set of bit sequences to such a space is referred to herein as a four-dimensional modulation scheme.

The modulation dimension may be further extended by mapping a set of bit sequences to a set of three REs 1104 (e.g., two symbols of the set of bit sequences may be mapped to three REs 1104 associated with the same symbol but different subcarriers). The space for such a mapping may be defined as:

$$\mathbb{C} \times \mathbb{C} \times \mathbb{C} \simeq \mathbb{R}^2 \times \mathbb{R}^2 \times \mathbb{R}^2 = \mathbb{R}^3 \times \mathbb{R}^3$$

The above mapping may be referred to herein as a three-dimensional modulation scheme, given that pairs of consecutive symbols spanning the three REs may be jointly mapped to the set of three REs 1104.

In some embodiments, joint modulation schemes of higher order dimension may be selected. In some embodiments, modulation schemes of greater than two dimensions may be applied to the modulation of a bit sequence for a single wireless device. However, higher order dimension modulations can be especially useful for increasing the number of constellation points that are available for jointly mapping multiple bit sequences, transmitted to or received from multiple wireless devices, to a set of constellation points. Increasing modulation dimension can, however, increase receive complexity (e.g., de-mapping may be more involved).

Figure 12:
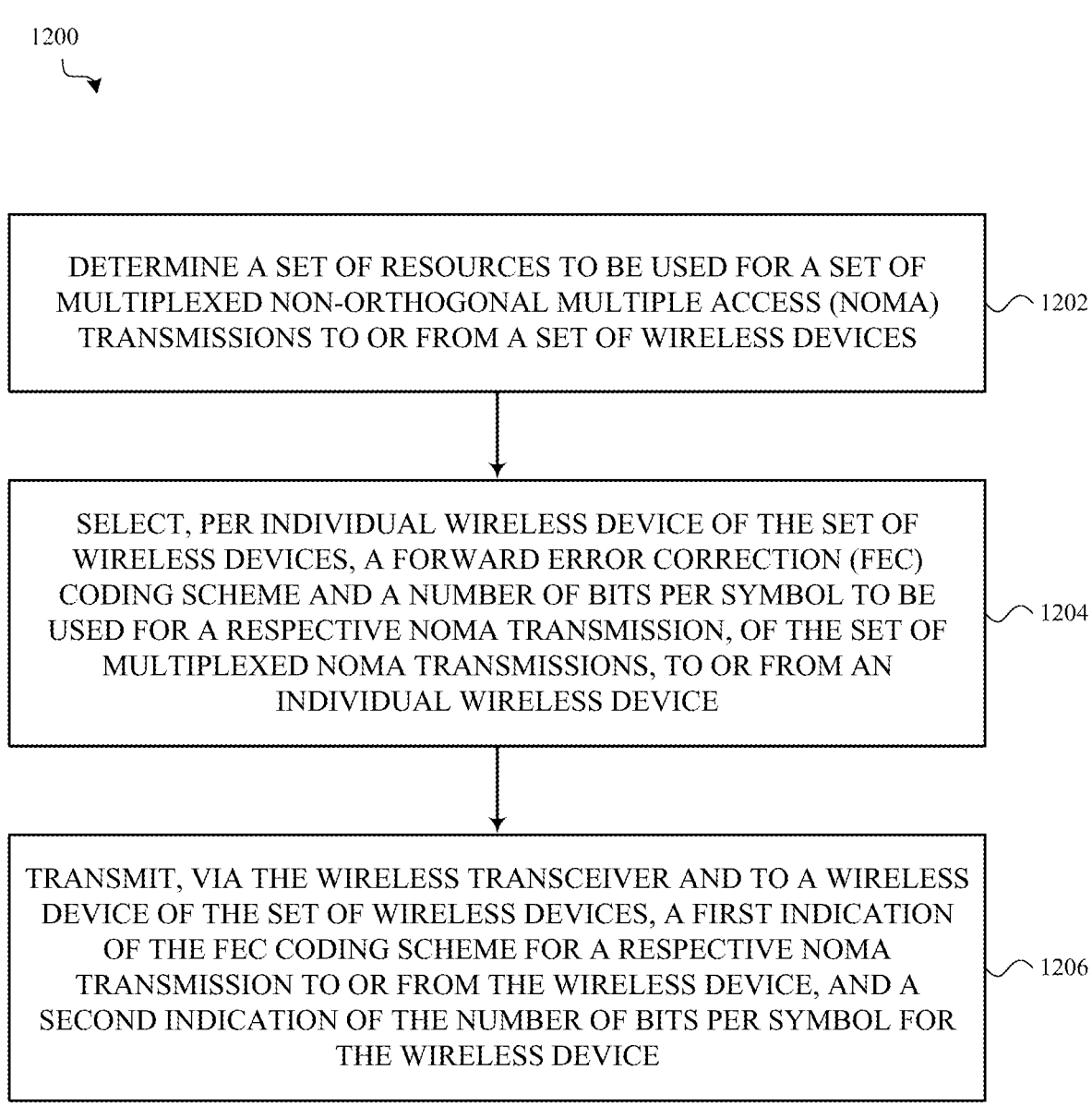

FIG. 12 illustrates an example method 1200 of a device. The device that performs the method 1200 may be a base station, a UE, or a master device that configures or participates in a set of D2D communications, depending on the embodiment. The method 1200 may be used to facilitate end-to-end adaptive NOMA modulation.

At 1202, the method 1200 may include determining a set of resources to be used for a set of multiplexed NOMA transmissions to or from a set of wireless devices.

At 1204, the method 1200 may include selecting, per individual wireless device of the set of wireless devices, an FEC coding scheme and a number of bits per symbol. The selected FEC coding scheme and number of bits per symbol, for an individual wireless device, may be used to transmit or receive a respective NOMA transmission, of the set of multiplexed NOMA transmissions, to or from an individual wireless device.

At 1206, the method 1200 may include transmitting (e.g., via a wireless transceiver), to a wireless device of the set of wireless devices, a first indication of the FEC coding scheme for a respective NOMA transmission to or from the wireless device, and a second indication of the number of bits per symbol for the wireless device. The operations at 1206 may be performed for each wireless device of the set of wireless devices.

The method 1200 may be variously embodied, extended, or adapted, as described with reference to FIGS. 3-5 and elsewhere in this description.

Figure 13:
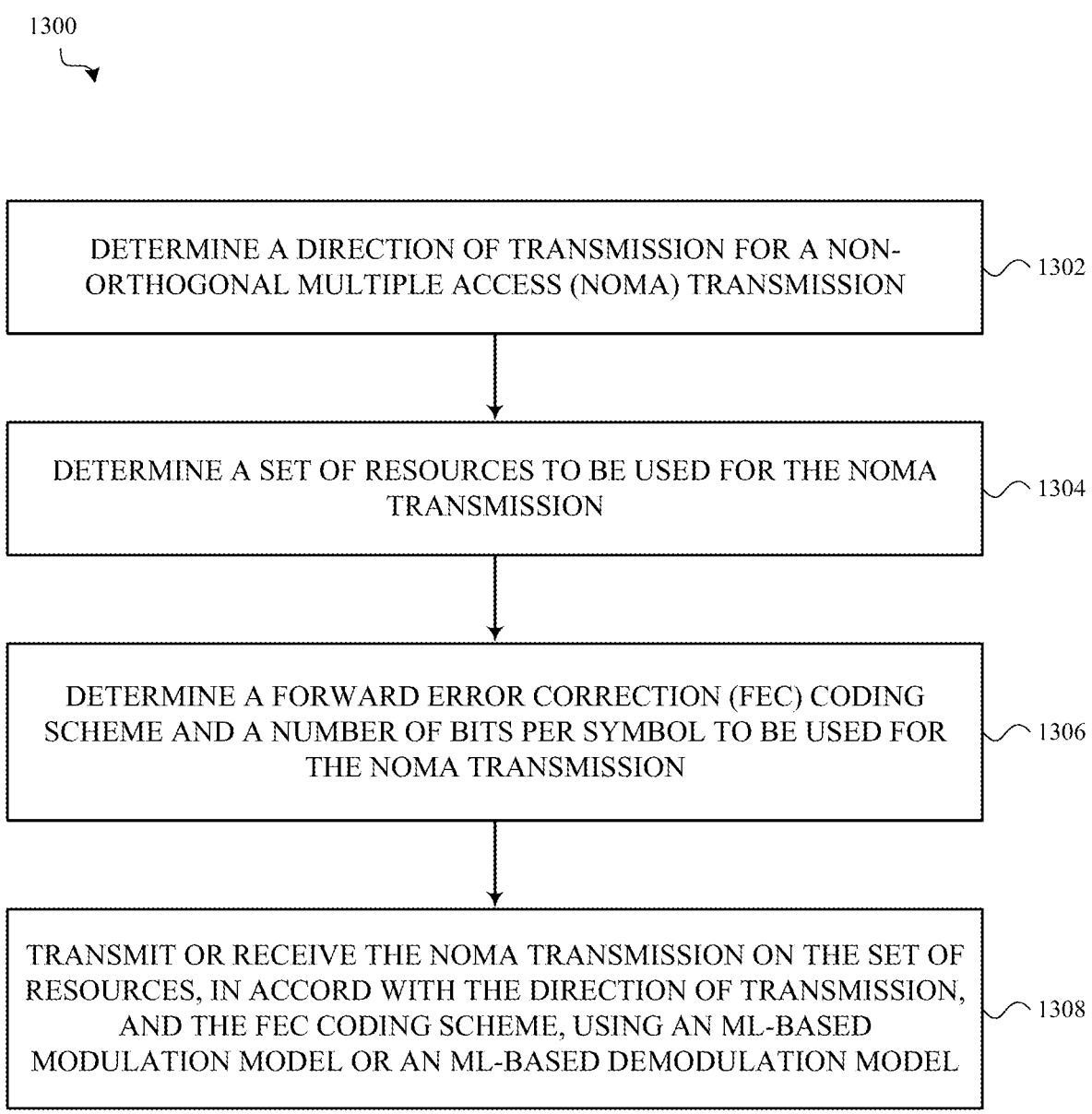

FIG. 13 illustrates an example method 1300 of a wireless device. The wireless device that performs the method 1300 may be a base station, a UE, or a device that participates in a set of D2D communications, depending on the embodiment. The method 1300 may be used to facilitate end-to-end adaptive NOMA modulation.

At 1302, the method 1300 may include determining a direction of transmission for a NOMA transmission (e.g., a DL direction, an UL direction, or a SL direction). In some embodiments, the direction of transmission may be implied by the receipt of DCI or UCI, for example.

At 1304, the method 1300 may include determining a set of resources to be used for the NOMA transmission.

At 1306, the method 1300 may include determining an FEC coding scheme and number of bits per symbol to be used for the NOMA transmission.

At 1308, the method 1300 may include transmitting or receiving the NOMA transmission on the set of resources, in accord with the direction of transmission, and the FEC coding scheme, using an ML-based modulation model or an ML-based demodulation model.

The method 1300 may be variously embodied, extended, or adapted, as described with reference to FIGS. 3-5 and elsewhere in this description.

FIG. 14 illustrates another example method 1400 of a device. The device that performs the method 1400 may be a base station, a UE, or a master device that configures or participates in a set of D2D communications, depending on the embodiment. The method 1400 may be used to facilitate codebook-based adaptive NOMA modulation.

At 1402, the method 1400 may include determining a set of resources to be used for a set of multiplexed NOMA transmissions to or from a set of wireless devices.

At 1404, the method 1400 may include selecting, per individual wireless device of the set of wireless devices, an FEC coding scheme. The selected FEC coding scheme for an individual wireless device may be used transmit or receive a respective NOMA transmission, of the set of multiplexed NOMA transmissions, to or from an individual wireless device.

At 1406, the method 1400 may include selecting, from a codebook, a joint modulation scheme to be used for the set of multiplexed NOMA transmissions.

At 1408, the method 1400 may include transmitting (e.g., via a wireless transceiver), to a wireless device of the set of wireless devices, a first indication of the FEC coding scheme for a respective NOMA transmission to or from the wireless device, and a second indication of the number of bits per symbol for the wireless device. The operations at 1408 may be performed for each wireless device of the set of wireless devices.

The method 1400 may be variously embodied, extended, or adapted, as described with reference to FIGS. 6-11 and elsewhere in this description.

Figure 15:
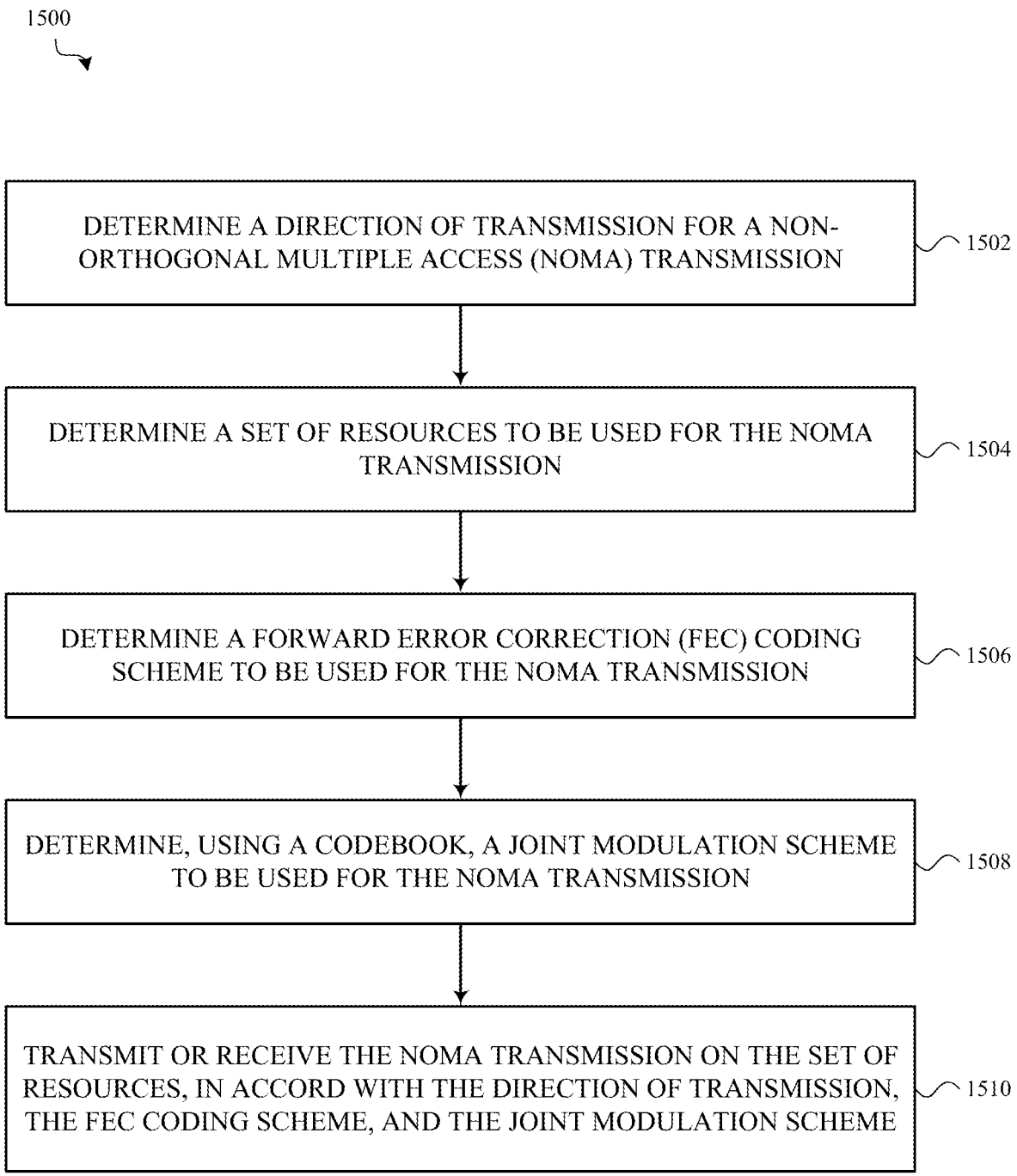

FIG. 15 illustrates another example method 1500 of a wireless device. The wireless device that performs the method 1500 may be a base station, a UE, or a device that participates in a set of D2D communications, depending on the embodiment. The method 1500 may be used to facilitate codebook-based adaptive NOMA modulation.

At 1502, the method 1500 may include determining a direction of transmission for a NOMA transmission (e.g., a DL direction, an UL direction, or a SL direction). In some embodiments, the direction of transmission may be implied by the receipt of DCI or UCI, for example.

At 1504, the method 1500 may include determining a set of resources to be used for the NOMA transmission.

At 1506, the method 1500 may include determining an FEC coding scheme to be used for the NOMA transmission.

At 1508, the method 1500 may include determining, using a codebook, a joint modulation scheme to be used for the NOMA transmission.

At 1510, the method 1500 may include transmitting or receiving the NOMA transmission on the set of resources, in accord with the direction of transmission, the FEC coding scheme, and the joint modulation scheme.

The method 1500 may be variously embodied, extended, or adapted, as described with reference to FIGS. 6-11 and elsewhere in this description.

Figure 16:
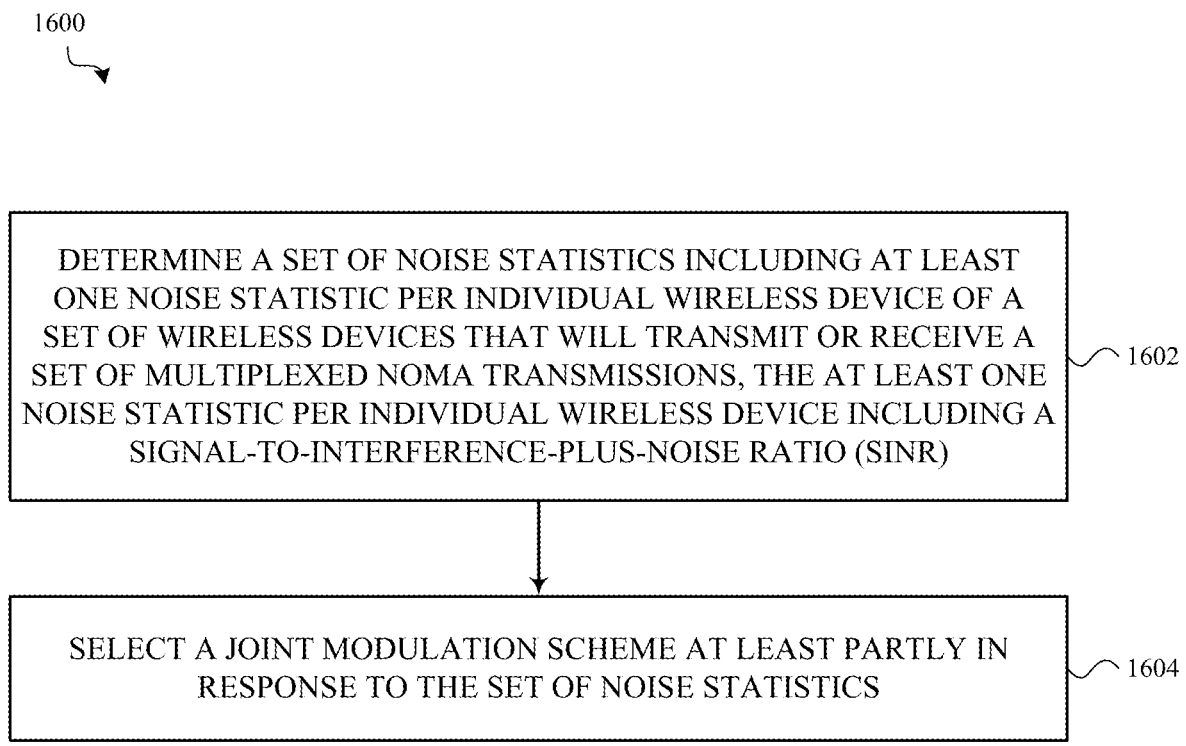

FIG. 16 illustrates another example method 1600 of a wireless device. The wireless device that performs the method 1600 may be a base station, a UE, or a device that participates in a set of D2D communications, depending on the embodiment. The method 1600 may be used to facilitate codebook-based adaptive NOMA modulation.

At 1602, the method 1600 may include determining a set of noise statistics including at least one noise statistic per individual wireless device of a set of wireless devices that will transmit or receive the set of multiplexed NOMA transmissions. The at least one noise statistic per individual wireless device may include an SINR.

At 1604, the method 1600 may include selecting the joint modulation scheme at least partly in response to the set of noise statistics.

The method 1600 may be variously embodied, extended, or adapted, as described with reference to FIGS. 3-11 and elsewhere in this description.

Embodiments contemplated herein include an apparatus having means to perform one or more elements of the method 1200, 1300, 1400, 1500, or 1600. In some embodiments of method 1200, 1300, 1400, 1500, or 1600, the apparatus may be, for example, an apparatus of a UE (such as a wireless device 1802 that is a UE, as described herein). In some embodiments of method 1200, 1300, 1400, 1500, or 1600, the apparatus may be, for example, an apparatus of a base station (such as a network device 1820 that is a base station, as described herein).

Embodiments contemplated herein include one or more non-transitory computer-readable media storing instructions to cause an electronic device, upon execution of the instructions by one or more processors of the electronic device, to perform one or more elements of the method 1200, 1300, 1400, 1500, or 1600. In some embodiments of method 1200, 1300, 1400, 1500, or 1600, the non-transitory computer-readable media may be, for example, a memory of a UE (such as a memory 1806 of a wireless device 1802 that is a UE, as described herein). In some embodiments of method 1200, 1300, 1400, 1500, or 1600, the non-transitory computer-readable media may be, for example, a memory of a base station (such as a memory 1824 of a network device 1820 that is a base station, as described herein).

Embodiments contemplated herein include an apparatus having logic, modules, or circuitry to perform one or more elements of the method 1200, 1300, 1400, 1500, or 1600. In some embodiments of method 1200, 1300, 1400, 1500, or 1600, the apparatus may be, for example, an apparatus of a UE (such as a wireless device 1802 that is a UE, as described herein). In some embodiments of method 1200, 1300, 1400, 1500, or 1600, the apparatus may be, for example, an apparatus of a base station (such as a network device 1820 that is a base station, as described herein).

Embodiments contemplated herein include an apparatus having one or more processors and one or more computer-readable media, using or storing instructions that, when executed by the one or more processors, cause the one or more processors to perform one or more elements of the method 1200, 1300, 1400, 1500, or 1600. In some embodiments of method 1200, 1300, 1400, 1500, or 1600, the apparatus may be, for example, an apparatus of a UE (such as a wireless device 1802 that is a UE, as described herein). In some embodiments of method 1200, 1300, 1400, 1500, or 1600, the apparatus may be, for example, an apparatus of a base station (such as a network device 1820 that is a base station, as described herein).

Embodiments contemplated herein include a signal as described in or related to one or more elements of the method 1200, 1300, 1400, 1500, or 1600.

Embodiments contemplated herein include a computer program or computer program product having instructions, wherein execution of the program by a processor causes the processor to carry out one or more elements of the method 1200, 1300, 1400, 1500, or 1600. In some embodiments of method 1200, 1300, 1400, 1500, or 1600, the processor may be a processor of a UE (such as a processor(s) 1804 of a wireless device 1802 that is a UE, as described herein), and the instructions may be, for example, located in the processor and/or on a memory of the UE (such as a memory 1806 of a wireless device 1802 that is a UE, as described herein). In some embodiments of method 1200, 1300, 1400, 1500, or 1600, the processor may be a processor of a base station (such as a processor(s) 1822 of a network device 1820 that is a base station, as described herein), and the instructions may be, for example, located in the processor and/or on a memory of the base station (such as a memory 1824 of a network device 1820 that is a base station, as described herein).

Figure 17:
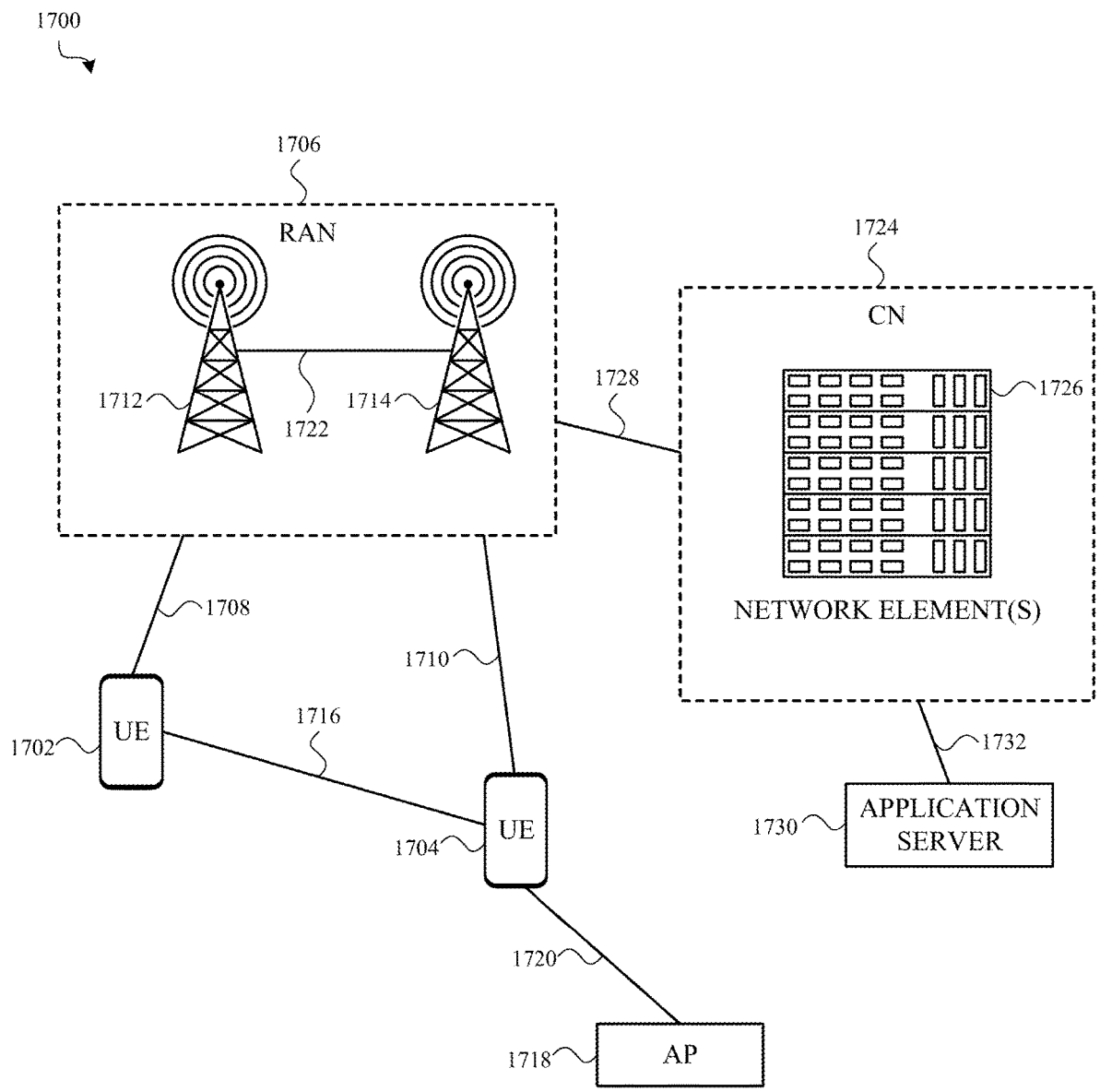
FIG. 17 illustrates an example architecture of a wireless communication system, according to embodiments disclosed herein.

FIG. 17 illustrates an example architecture of a wireless communication system 1700, according to embodiments disclosed herein. The following description is provided for an example wireless communication system 1700 that operates in conjunction with the LTE system standards and/or 5G or NR system standards as provided by 3GPP technical specifications.

As shown by FIG. 17, the wireless communication system 1700 includes UE 1702 and UE 1704 (although any number of UEs may be used). In this example, the UE 1702 and the UE 1704 are illustrated as smartphones (e.g., handheld touchscreen mobile computing devices connectable to one or more cellular networks), but may also comprise any mobile or non-mobile computing device configured for wireless communication.

The UE 1702 and UE 1704 may be configured to communicatively couple with a RAN 1706. In embodiments, the RAN 1706 may be NG-RAN, E-UTRAN, etc. The UE 1702 and UE 1704 utilize connections (or channels) (shown as connection 1708 and connection 1710, respectively) with the RAN 1706, each of which comprises a physical communications interface. The RAN 1706 can include one or more base stations, such as base station 1712 and base station 1714, that enable the connection 1708 and connection 1710.

In this example, the connection 1708 and connection 1710 are air interfaces to enable such communicative coupling, and may be consistent with RAT(s) used by the RAN 1706, such as, for example, an LTE and/or NR.

In some embodiments, the UE 1702 and UE 1704 may also directly exchange communication data via a sidelink interface 1716. The UE 1704 is shown to be configured to access an access point (shown as AP 1718) via connection 1720. By way of example, the connection 1720 can comprise a local wireless connection, such as a connection consistent with any IEEE 802.11 protocol, wherein the AP 1718 may comprise a Wi-Fi® router. In this example, the AP 1718 may be connected to another network (for example, the Internet) without going through a CN 1724.

In embodiments, the UE 1702 and UE 1704 can be configured to communicate using orthogonal frequency division multiplexing (OFDM) communication signals with each other or with the base station 1712 and/or the base station 1714 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 1712 or base station 1714 may be implemented as one or more software entities running on server computers as part of a virtual network. In addition, or in other embodiments, the base station 1712 or base station 1714 may be configured to communicate with one another via interface 1722. In embodiments where the wireless communication system 1700 is an LTE system (e.g., when the CN 1724 is an EPC), the interface 1722 may be an X2 interface. The X2 interface may be defined between two or more base stations (e.g., two or more eNBs and the like) that connect to an EPC, and/or between two eNBs connecting to the EPC. In embodiments where the wireless communication system 1700 is an NR system (e.g., when CN 1724 is a 5GC), the interface 1722 may be an Xn interface. The Xn interface is defined between two or more base stations (e.g., two or more gNBs and the like) that connect to 5GC, between a base station 1712 (e.g., a gNB) connecting to 5GC and an eNB, and/or between two eNBs connecting to 5GC (e.g., CN 1724).

The RAN 1706 is shown to be communicatively coupled to the CN 1724. The CN 1724 may comprise one or more network elements 1726, which are configured to offer various data and telecommunications services to customers/subscribers (e.g., users of UE 1702 and UE 1704) who are connected to the CN 1724 via the RAN 1706. The components of the CN 1724 may be implemented in one physical device or separate physical devices including components to read and execute instructions from a machine-readable or computer-readable medium (e.g., a non-transitory machine-readable storage medium).

In embodiments, the CN 1724 may be an EPC, and the RAN 1706 may be connected with the CN 1724 via an S1 interface 1728. In embodiments, the S1 interface 1728 may be split into two parts, an S1 user plane (S1-U) interface, which carries traffic data between the base station 1712 or base station 1714 and a serving gateway (S-GW), and the S1-MME interface, which is a signaling interface between the base station 1712 or base station 1714 and mobility management entities (MMEs).

In embodiments, the CN 1724 may be a 5GC, and the RAN 1706 may be connected with the CN 1724 via an NG interface 1728. In embodiments, the NG interface 1728 may be split into two parts, an NG user plane (NG-U) interface, which carries traffic data between the base station 1712 or base station 1714 and a user plane function (UPF), and the S1 control plane (NG-C) interface, which is a signaling interface between the base station 1712 or base station 1714 and access and mobility management functions (AMFs).

Generally, an application server 1730 may be an element offering applications that use internet protocol (IP) bearer resources with the CN 1724 (e.g., packet switched data services). The application server 1730 can also be configured to support one or more communication services (e.g., VoIP sessions, group communication sessions, etc.) for the UE 1702 and UE 1704 via the CN 1724. The application server 1730 may communicate with the CN 1724 through an IP communications interface 1732.

Figure 18:
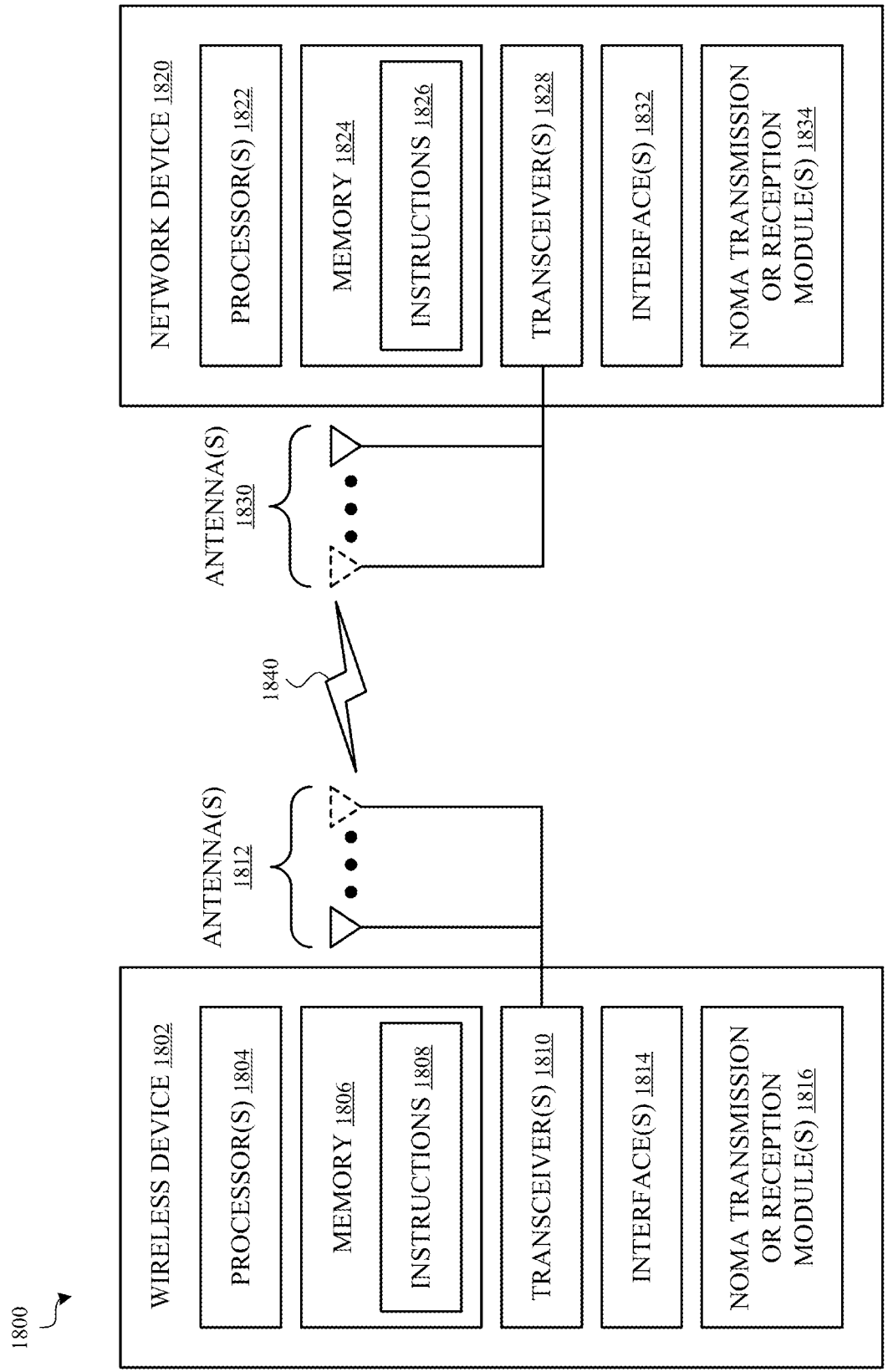
FIG. 18 illustrates a system for performing signaling between a wireless device and a network device, according to embodiments disclosed herein.

FIG. 18 illustrates a system 1800 for performing signaling 1840 between a wireless device 1802 and a network device 1820, according to embodiments disclosed herein. The system 1800 may be a portion of a wireless communication system as herein described. The wireless device 1802 may be, for example, a UE of a wireless communication system. The network device 1820 may be, for example, a base station (e.g., an eNB or a gNB) of a wireless communication system.

The wireless device 1802 may include one or more processor(s) 1804. The processor(s) 1804 may execute instructions such that various operations of the wireless device 1802 are performed, as described herein. The processor(s) 1804 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1802 may include a memory 1806. The memory 1806 may be a non-transitory computer-readable storage medium that stores instructions 1808 (which may include, for example, the instructions being executed by the processor(s) 1804). The instructions 1808 may also be referred to as program code or a computer program. The memory 1806 may also store data used by, and results computed by, the processor(s) 1804.

The wireless device 1802 may include one or more transceiver(s) 1810 that may include radio frequency (RF) transmitter and/or receiver circuitry that use the antenna(s)

1812 of the wireless device 1802 to facilitate signaling (e.g., the signaling 1840) to and/or from the wireless device 1802 with other devices (e.g., the network device 1820) according to corresponding RATs.

The wireless device 1802 may include one or more antenna(s) 1812 (e.g., one, two, four, or more). For embodiments with multiple antenna(s) 1812, the wireless device 1802 may leverage the spatial diversity of such multiple antenna(s) 1812 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1802 may be accomplished according to precoding (or digital beamforming) that is applied at the wireless device 1802 that multiplexes the data streams across the antenna(s) 1812 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1802 may implement analog beamforming techniques, whereby phases of the signals sent by the antenna(s) 1812 are relatively adjusted such that the (joint) transmission of the antenna(s) 1812 can be directed (this is sometimes referred to as beam steering).

The wireless device 1802 may include one or more interface(s) 1814. The interface(s) 1814 may be used to provide input to or output from the wireless device 1802. For example, a wireless device 1802 that is a UE may include interface(s) 1814 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1810/antenna(s) 1812 already described) that allow for communication between the UE and other devices and may operate according to known protocols (e.g., Wi-Fi®, Bluetooth®, and the like).

The wireless device 1802 may include one or more NOMA transmission or reception module(s) 1816. The NOMA transmission or reception module(s) 1816 may be implemented via hardware, software, or combinations thereof. For example, the NOMA transmission or reception module(s) 1816 may be implemented as a processor, circuit, and/or instructions 1808 stored in the memory 1806 and executed by the processor(s) 1804. In some examples, the NOMA transmission or reception module(s) 1816 may be integrated within the processor(s) 1804 and/or the transceiver(s) 1810. For example, the NOMA transmission or reception module(s) 1816 may be implemented by a combination of software components (e.g., executed by a DSP or a general processor) and hardware components (e.g., logic gates and circuitry) within the processor(s) 1804 or the transceiver(s) 1810.

The NOMA transmission or reception module(s) 1816 may be used for various aspects of the present disclosure, for example, aspects of FIGS. 1-16. The NOMA transmission or reception module(s) 1816 may be used to receive a NOMA transmission of a set of NOMA transmissions that is transmitted by the network device 1820 (e.g., in a DL transmission); or receive a NOMA transmission of a set of NOMA transmissions that is transmitted by another wireless device (e.g., in an SL or D2D transmission); or transmit a NOMA transmission of a set of NOMA transmissions to the network device 1820 (e.g., in a DL transmission) or another wireless device (e.g., in an SL or D2D transmission).

The network device 1820 may include one or more processor(s) 1822. The processor(s) 1822 may execute instructions such that various operations of the network device 1820 are performed, as described herein. The processor(s) 1804 may include one or more baseband processors implemented using, for example, a CPU, a DSP, an ASIC, a controller, an FPGA device, another hardware device, a firmware device, or any combination thereof configured to perform the operations described herein.

The network device 1820 may include a memory 1824. The memory 1824 may be a non-transitory computer-readable storage medium that stores instructions 1826 (which may include, for example, the instructions being executed by the processor(s) 1822). The instructions 1826 may also be referred to as program code or a computer program. The memory 1824 may also store data used by, and results computed by, the processor(s) 1822.

The network device 1820 may include one or more transceiver(s) 1828 that may include RF transmitter and/or receiver circuitry that use the antenna(s) 1830 of the network device 1820 to facilitate signaling (e.g., the signaling 1840) to and/or from the network device 1820 with other devices (e.g., the wireless device 1802) according to corresponding RATs.

The network device 1820 may include one or more antenna(s) 1830 (e.g., one, two, four, or more). In embodiments having multiple antenna(s) 1830, the network device 1820 may perform MIMO, digital beamforming, analog beamforming, beam steering, etc., as has been described.

The network device 1820 may include one or more interface(s) 1832. The interface(s) 1832 may be used to provide input to or output from the network device 1820. For example, a network device 1820 that is a base station may include interface(s) 1832 made up of transmitters, receivers, and other circuitry (e.g., other than the transceiver(s) 1828/antenna(s) 1830 already described) that enables the base station to communicate with other equipment in a core network, and/or that enables the base station to communicate with external networks, computers, databases, and the like for purposes of operations, administration, and maintenance of the base station or other equipment operably connected thereto.

The network device 1820 may include one or more NOMA transmission or reception module(s) 1834. The NOMA transmission or reception module(s) 1834 may be implemented via hardware, software, or combinations thereof. For example, the NOMA transmission or reception module(s) 1834 may be implemented as a processor, circuit, and/or instructions 1826 stored in the memory 1824 and executed by the processor(s) 1822. In some examples, the NOMA transmission or reception module(s) 1834 may be integrated within the processor(s) 1822 and/or the transceiver(s) 1828. For example, the NOMA transmission or reception module(s) 1834 may be implemented by a combination of software components (e.g., executed by a DSP or a general processor) and hardware components (e.g., logic gates and circuitry) within the processor(s) 1822 or the transceiver(s) 1828.

The NOMA transmission or reception module(s) 1834 may be used for various aspects of the present disclosure, for example, aspects of FIGS. 1-16. The NOMA transmission or reception module(s) 1834 may be used to configure a set of multiplexed NOMA transmissions that is: transmitted or received by the network device 1820 to a set of wireless devices including the wireless device 1802 (e.g., in DL transmissions); or received by the network device 1820 from a set of wireless devices including the wireless device 1802 (e.g., in UL transmissions); or transmitted between other wireless devices (e.g., in sidelink transmissions) including the wireless device 1802.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. An apparatus of a wireless device comprising memory coupled to a processor, the
processor configured to:
determine an assigned device order of the wireless device;
determine that a non-orthogonal multiple access (NOMA) transmission is to be received;
determine a set of resources to be used for the NOMA transmission;
determine a forward error correction (FEC) coding scheme to be used for the NOMA transmission;
determine, using a codebook, a joint modulation scheme to be used for the NOMA transmission;
receive the NOMA transmission on the set of resources in accord with the FEC coding scheme; and
demodulate the NOMA transmission based on the joint modulation scheme, the demodulation including,
determining a demodulation result of a set of one or more wireless devices having a set of lower assigned device orders than the assigned device order of the wireless device;
using the demodulation result of the set of one or more wireless devices to determine a constellation point associated with a bit sequence of the NOMA transmission; and
demodulating the constellation point.

2. The apparatus of claim 1, wherein:
the processor is configured to,
receive a first indication of the FEC coding scheme; and
receive a second indication of the joint modulation scheme.

3. The apparatus of claim 1, wherein the processor is configured to determine a joint modulation dimension associated with the joint modulation scheme, the joint modulation dimension associated with a set of two or more resource elements.

4. The apparatus of claim 1, wherein the NOMA transmission is a device-to-device (D2D) transmission in a set of multiplexed NOMA D2D transmissions.

5. A method, comprising:
determining an assigned device order of a wireless device;
determining that a non-orthogonal multiple access (NOMA) transmission is to be received;
determining a set of resources to be used for the NOMA transmission;
determining a forward error correction (FEC) coding scheme to be used for the NOM/transmission;
determining, using a codebook, a joint modulation scheme to be used for the NOMA transmission;
receiving the NOMA transmission on the set of resources in accord with the FEC coding scheme; and
demodulating the NOMA transmission based on the joint modulation scheme, the demodulation including,
determining a demodulation result of a set of one or more wireless devices having a set of lower assigned device orders than the assigned device order of the wireless device;

using the demodulation result of the set of one or more wireless devices to determine a constellation point associated with a bit sequence of the NOMA transmission; and
demodulating the constellation point.

6. The method of claim 5, further comprising:
receiving a first indication of the FEC coding scheme; and
receiving a second indication of the joint modulation scheme.

7. The method of claim 5, further comprising:
determining a joint modulation dimension associated with the joint modulation scheme, the joint modulation dimension associated with a set of two or more resource elements.

8. The method of claim 5, wherein the NOMA transmission is a device-to-device (D2D) transmission in a set of multiplexed NOMA D2D transmissions.

9. An apparatus, comprising:
one or more processors; and
one or more non-transitory computer-readable media storing instructions that, when executed by the one or more processors, cause the one or more processors to perform:
determining an assigned device order of a wireless device;
determining that a non-orthogonal multiple access (NOMA) transmission is to be received;
determining a set of resources to be used for the NOMA transmission;
determining a forward error correction (FEC) coding scheme to be used for the NOMA transmission;
determining, using a codebook, a joint modulation scheme to be used for the NOMA transmission;
receiving the NOMA transmission on the set of resources in accord with the FEC coding scheme; and
demodulating the NOMA transmission based on the joint modulation scheme, the demodulation including,
determining a demodulation result of a set of one or more wireless devices having a set of lower assigned device orders than the assigned device order of the wireless device;
using the demodulation result of the set of one or more wireless devices to determine a constellation point associated with a bit sequence of the NOMA transmission; and
demodulating the constellation point.

10. The apparatus of claim 9, wherein the instructions, when executed by the one or more processors, further cause the one or more processors to perform:
receiving a first indication of the FEC coding scheme; and
receiving a second indication of the joint modulation scheme.

11. The apparatus of claim 1, wherein the NOMA transmission is a sidelink transmission in a set of multiplexed NOMA sidelink transmissions.

12. The method of claim 5, wherein the NOMA transmission is a sidelink transmission in a set of multiplexed NOMA sidelink transmissions.

13. The apparatus of claim 9, further comprising:
determining a joint modulation dimension associated with the joint modulation scheme, the joint modulation dimension associated with a set of two or more resource elements.

14. The apparatus of claim 9, wherein the NOMA transmission is a device-to-device (D2D) transmission in a set of multiplexed NOMA D2D transmissions.

15. The apparatus of claim 9, wherein the NOMA transmission is a sidelink transmission in a set of multiplexed NOMA sidelink transmissions.

* * * * *